United States Patent
Xu et al.

(10) Patent No.: US 12,452,636 B2
(45) Date of Patent: Oct. 21, 2025

(54) DATA COMMUNICATION METHOD AND COMMUNICATION APPARATUS

(71) Applicant: HUAWEI TECHNOLOGIES CO., LTD., Shenzhen (CN)

(72) Inventors: Shengfeng Xu, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 18/189,348

(22) Filed: Mar. 24, 2023

(65) Prior Publication Data
US 2023/0232196 A1 Jul. 20, 2023

Related U.S. Application Data

(63) Continuation of application No. PCT/CN2020/118207, filed on Sep. 27, 2020.

(51) Int. Cl.
*H04W 4/70* (2018.01)
*H04W 4/50* (2018.01)
(Continued)

(52) U.S. Cl.
CPC ........... *H04W 4/70* (2018.02); *H04W 4/50* (2018.02); *H04W 76/14* (2018.02); *H04W 88/04* (2013.01)

(58) Field of Classification Search
CPC ......... H04W 4/70; H04W 76/14; H04W 4/50; H04W 88/04
(Continued)

(56) References Cited

U.S. PATENT DOCUMENTS

2011/0075675 A1* 3/2011 Koodli ............... H04M 15/41
370/401
2013/0258967 A1* 10/2013 Watfa ................. H04W 76/10
370/329
(Continued)

FOREIGN PATENT DOCUMENTS

CN 107637105 A 1/2018
CN 111491370 A 8/2020
(Continued)

OTHER PUBLICATIONS

3GPP TR 23.752 V0.4.0 (Jun. 2020), 3rd Generation Partnership Project; Technical Specification Group Services and System Aspects; Study on system enhancement for Proximity based Services (ProSe) in the 5G System (5GS) (Release 17), 121 pages.
(Continued)

*Primary Examiner* — Mark G. Pannell
(74) *Attorney, Agent, or Firm* — Hauptman Ham, LLP

(57) ABSTRACT

A data communication method includes receiving a first message. The first message includes an identifier of a second terminal, and the first message requests to perform communication of a first application between a first terminal and the second terminal. The data communication method also includes sending first information to an access network device based on the first message. The first information includes an identifier of a first bearer and an identifier of a second bearer, the first bearer is for transmitting data of the first application for the first terminal, the second bearer is for transmitting the data of the first application for the second terminal, and the first information is used by the access network device to directly forward the data of the first application between the first terminal and the second terminal.

20 Claims, 16 Drawing Sheets

(51) Int. Cl.
*H04W 76/14* (2018.01)
*H04W 88/04* (2009.01)

(58) Field of Classification Search
USPC .................................................... 455/414.1
See application file for complete search history.

(56) References Cited

U.S. PATENT DOCUMENTS

| | | | | |
|---|---|---|---|---|
| 2013/0287012 | A1* | 10/2013 | Pragada | H04W 76/14 370/338 |
| 2013/0315079 | A1* | 11/2013 | Edge | H04W 76/14 370/252 |
| 2013/0321558 | A1* | 12/2013 | Nishida | H04N 7/147 348/14.02 |
| 2014/0162633 | A1* | 6/2014 | Hwang | H04W 76/14 455/67.11 |
| 2014/0254523 | A1* | 9/2014 | Chai | H04W 76/14 370/329 |
| 2014/0273943 | A1* | 9/2014 | Wu | H04L 12/1485 455/406 |
| 2014/0341112 | A1* | 11/2014 | Agiwal | H04W 36/033 370/328 |
| 2014/0348081 | A1* | 11/2014 | Liao | H04L 67/51 370/329 |
| 2016/0174285 | A1* | 6/2016 | Ke | H04W 8/02 370/329 |
| 2016/0262197 | A1* | 9/2016 | He | H04W 76/12 |
| 2017/0288886 | A1* | 10/2017 | Atarius | H04W 28/0257 |
| 2019/0191467 | A1* | 6/2019 | Dao | H04W 76/11 |
| 2019/0239280 | A1* | 8/2019 | Li | H04W 64/003 |
| 2019/0297121 | A1* | 9/2019 | Qiao | H04L 65/1016 |
| 2020/0015130 | A1* | 1/2020 | Wang | H04W 76/12 |
| 2020/0053828 | A1* | 2/2020 | Bharatia | H04W 76/11 |
| 2020/0084663 | A1* | 3/2020 | Park | H04W 8/08 |
| 2020/0120728 | A1* | 4/2020 | Wallentin | H04W 88/04 |
| 2020/0196375 | A1 | 6/2020 | Ryu et al. | |
| 2020/0351980 | A1* | 11/2020 | Talebi Fard | H04W 76/40 |
| 2022/0256640 | A1* | 8/2022 | Zhang | H04L 67/146 |
| 2023/0038925 | A1* | 2/2023 | Andres Maldonado | H04L 47/283 |
| 2023/0044660 | A1* | 2/2023 | Zhu | H04W 4/06 |
| 2023/0070882 | A1* | 3/2023 | Youn | H04W 28/02 |
| 2023/0081286 | A1* | 3/2023 | Liang | H04W 36/0007 370/331 |
| 2023/0262734 | A1* | 8/2023 | Qi | H04L 12/189 455/414.1 |

FOREIGN PATENT DOCUMENTS

| | | |
|---|---|---|
| CN | 111836402 A | 10/2020 |
| WO | 2015062287 A1 | 5/2015 |
| WO | 2016193783 A1 | 12/2016 |

OTHER PUBLICATIONS

3GPP TR 23.752 V0.5.0 (Sep. 2020), 3rd Generation Partnership Project; Technical Specification Group Services and System Aspects; Study on system enhancement for Proximity based Services (ProSe) in the 5G System (5GS) (Release 17), 162 pages.

Extended European Search Report issued in corresponding European Application No. 20954693.6, dated Aug. 23, 2023, pp. 1-11.

* cited by examiner

DATA COMMUNICATION METHOD AND COMMUNICATION APPARATUS

CROSS-REFERENCE TO RELATED APPLICATIONS

This application is a continuation of International Application No. PCT/CN2020/118207, filed on Sep. 27, 2020, the disclosure of which is hereby incorporated by reference in its entirety.

TECHNICAL FIELD

This application relates to the field of communication technologies, and in particular, to a data communication method and a communication apparatus.

BACKGROUND

Device-to-device (D2D) communication allows direct communication between terminals. The D2D communication includes one-to-many communication and one-to-one communication. The one-to-many communication corresponds to multicast and broadcast communication, and the one-to-one communication corresponds to unicast communication. In the one-to-one communication, a sender terminal and a receiver terminal that are in a short distance range may directly communicate with each other after mutual discovery. In the D2D communication, the terminals communicate with each other based on a proximity service communication 5 (ProSe Communication 5, PC5) interface. However, communication between two terminals is limited by a distance. If the distance between the two terminals is excessively long, direct communication cannot be performed.

SUMMARY

Embodiments of this application provide a data communication method and a communication apparatus, so that communication between two terminals that are far away from each other can be implemented, and a delay is not high.

According to a first aspect, an embodiment of this application provides a data communication method. The method may be performed by a session management network element or a component (for example, a processor, a chip, or a chip system) of the session management network element. The data communication method may include: The session management network element receives a first message, where the first message includes an identifier of a second terminal, and the first message requests to perform communication of a first application between a first terminal and the second terminal. For example, the first message may be a create session management context request (Create SM Context Request) message, an update session management context (Update SM Context) message, or a newly defined message, for example, an association establishment/modification request message.

The session management network element may determine an identifier of a second bearer based on the identifier of the second terminal in the first message, and send first information to an access network device. The first information may include an identifier of a first bearer and the identifier of the second bearer. The first bearer is for transmitting data of the first application for the first terminal, and the second bearer is for transmitting the data of the first application for the second terminal.

Optionally, the session management network element may send the first information to the access network device through an access and mobility management network element. For example, the session management network element may send the first information to the access and mobility management network element via an update session management context response (Update SM Context Response) message or a session management context status notify (SM Context Status Notify) message. The access and mobility management network element sends the first information to the access network device via an N2 message.

Accordingly, the access network device receives the first information, and directly forwards the data of the first application between the first terminal and the second terminal based on the identifier of the first bearer and the identifier of the second bearer.

That the access network device directly forwards the data of the first application between the first terminal and the second terminal may be: the access network device receives the data of the first application from the first terminal on the first bearer, and directly sends the data of the first application to the second terminal on the second bearer; or the access network device receives the data of the first application from the second terminal on the second bearer, and directly sends the data of the first application to the first terminal on the first bearer, without forwarding the data of the first application through a core network.

Through implementation of the method described in the first aspect, the access network device directly forwards the data of the first application between the first terminal and the second terminal, so that communication between two terminals that are far away from each other can be implemented, and the data is not transmitted through the core network, to ensure that a delay of transmitting the data of the first application between the first terminal and the second terminal is not high.

In a possible implementation of the first aspect, the identifier of the second terminal may be an application layer identifier of the second terminal or a discovery parameter of the second terminal, the application layer identifier of the second terminal is an identifier of the second terminal in the first application, and the discovery parameter of the second terminal corresponds to the application layer identifier of the second terminal in the first application.

Through implementation of the method, the application layer identifier of the second terminal or the discovery parameter of the second terminal is used as the identifier of the second terminal, so that the identifier of the second terminal in the first application is uniquely determined, and the identifier of the second bearer is determined based on the identifier of the second terminal.

Optionally, both the first bearer and the second bearer may be sessions, or both the first bearer and the second bearer are quality of service (QOS) flows.

In a possible implementation of the first aspect, the session management network element may obtain the identifier of the second bearer based on the identifier of the second terminal, and send the first information to the access network device based on the identifier of the second bearer.

Through implementation of the method, the identifier of the second bearer may be determined based on the identifier of the second terminal, to quickly obtain the identifier of the second bearer.

In a possible implementation of the first aspect, in addition to the identifier of the second terminal, the first message received by the session management network element may further include an identifier of the first application. The session management network element may obtain the identifier of the second bearer based on the identifier of the second terminal and the identifier of the first application.

Through implementation of the method, the identifier of the second terminal in the first application can be uniquely determined based on the identifier of the first application and the identifier of the second terminal, to avoid a problem that the identifier of the second bearer cannot be accurately obtained because the identifier of the second terminal is repeated in different applications.

In a possible implementation of the first aspect, the identifier of the second terminal is the discovery parameter of the second terminal. After receiving the first message including the discovery parameter of the second terminal, the session management network element sends a second message to a direct discovery name management function (DDNMF) network element, where the second message includes the discovery parameter of the second terminal, and the second message requests a subscription permanent identifier (SUPI) that is of the second terminal and that corresponds to the discovery parameter of the second terminal.

Accordingly, the DDNMF network element sends the SUPI of the second terminal to the session management network element, and the session management network element receives the SUPI of the second terminal from the DDNMF network element, and determines the identifier of the second bearer based on the SUPI of the second terminal. For example, the second bearer is the session, and the session management network element may use, as the identifier of the second bearer, a first session that is established for the second terminal and that is used for D2D communication.

Through implementation of the method, the session management network element may obtain the identifier of the second bearer as required, to save storage space.

In a possible implementation of the first aspect, the second bearer is the QoS flow, and a method in which the session management network element determines the identifier of the second bearer based on the SUPI of the second terminal may include: The session management network element determines the first session of the second terminal based on the SUPI of the second terminal, where the first session may be a session that is established for the second terminal and that is used for D2D communication.

The session management network element further establishes a first QoS flow of the first session based on the discovery parameter of the second terminal, to determine a QoS flow identifier of the first QoS flow as the identifier of the second bearer.

Through implementation of the method, the second bearer is the QoS flow, so that configuration and forwarding at a QoS flow granularity can be supported.

In a possible implementation of the first aspect, the session management network element may obtain a correspondence between the identifier of the second terminal and the identifier of the second bearer. After receiving the first message including the identifier of the second terminal, the session management network element may determine, based on the correspondence, the identifier that is of the second bearer and that corresponds to the identifier of the second terminal.

Through implementation of the method, the session management network element may prestore the correspondence between the identifier of the second terminal and the identifier of the second bearer, so that the corresponding identifier of the second bearer can be quickly obtained when the identifier of the second terminal is received.

In a possible implementation of the first aspect, an obtaining manner in which the session management network element obtains the correspondence between the identifier of the second terminal and the identifier of the second bearer may include the following steps:

The session management network element may receive second information from the second terminal, where the second information includes the identifier of the second terminal and the identifier of the second bearer, the identifier of the second terminal may be the application layer identifier of the second terminal or the discovery parameter of the second terminal, and the second bearer may be the session or the QoS flow.

The session management network element may establish the correspondence between the identifier of the second terminal and the identifier of the second bearer based on the second information.

Through implementation of the method, the second terminal sends the identifier of the second terminal and the identifier of the second bearer to the session management network element, so that the session management network element can quickly establish the correspondence between the identifier of the second terminal and the identifier of the second bearer.

In a possible implementation of the first aspect, the second bearer is the QoS flow, and an obtaining manner in which the session management network element obtains the correspondence between the identifier of the second terminal and the identifier of the second bearer may include the following steps:

The session management network element may receive third information from the second terminal, where the third information includes the identifier of the second terminal and a session identifier of the second terminal, and the session identifier identifies a first session of the second terminal.

The session management network element further establishes a first QoS flow of the first session based on the identifier of the second terminal, to establish a correspondence between the identifier of the second terminal and a QoS flow identifier of the first QoS flow.

Through implementation of the method, the second bearer is the QoS flow, so that configuration and forwarding at a QoS flow granularity can be supported.

In a possible implementation of the first aspect, the third information further includes first indication information, the first indication information indicates to establish the QoS flow, and the session management network element establishes the first QoS flow of the first session based on the identifier of the second terminal and the first indication information.

In a possible implementation of the first aspect, the identifier of the second terminal is the application layer identifier of the second terminal, and an obtaining manner in which the session management network element obtains the correspondence between the identifier of the second terminal and the identifier of the second bearer may include the following steps:

The session management network element may receive fourth information from a policy control function network element, where the fourth information may include the application layer identifier of the second terminal and a session management policy association identifier, and the session management policy association identifier is for uniquely determining a first session of the second terminal between the session management network element and the policy control function network element.

The session management network element may establish a correspondence between the application layer identifier of the second terminal and the identifier of the second bearer based on the session management policy association identifier. Optionally, the second bearer may be the session or the QoS flow. For example, if the second bearer is the session, the session management network element establishes a correspondence between the application layer identifier of the second terminal and a session identifier of the first session of the second terminal.

Through implementation of the method, the session management network element may conveniently obtain the application layer identifier of the second terminal and the session management policy association identifier from the policy control function network element, to establish the correspondence between the application layer identifier of the second terminal and the identifier of the second bearer.

In a possible implementation of the first aspect, the second bearer is the QoS flow, and a manner in which the session management network element establishes the correspondence between the application layer identifier of the second terminal and the identifier of the second bearer based on the session management policy association identifier may include the following steps:

The session management network element may determine the first session of the second terminal based on the session management policy association identifier, and establish a first QoS flow of the first session based on the application layer identifier of the second terminal, to establish a correspondence between the application layer identifier of the second terminal and a QoS flow identifier of the first QoS flow.

Optionally, the fourth information may further include indication information indicating to establish the QoS flow, so that the session management network element establishes the first QoS flow of the first session based on the application layer identifier of the second terminal and the indication information.

Through implementation of the method, the second bearer is the QoS flow, and the session management policy association identifier is fully used, to establish the correspondence between the application layer identifier of the second terminal and the QoS flow identifier of the first QoS flow. This is not only compatible with an existing communication system, but also can support configuration and forwarding at a QoS flow granularity.

In a possible implementation of the first aspect, the identifier of the second terminal is the discovery parameter of the second terminal, and an obtaining manner in which the session management network element obtains the correspondence between the identifier of the second terminal and the identifier of the second bearer may include the following steps:

The session management network element may receive fifth information from a DDNMF network element, where the fifth information includes the discovery parameter of the second terminal and an SUPI of the second terminal; and the session management network element may establish a correspondence between the discovery parameter of the second terminal and the identifier of the second bearer based on the SUPI of the second terminal. The second bearer is the session or the QoS flow. For example, the second bearer is the session, and the session management network element determines a first session of the second terminal based on the SUPI of the second terminal, and establishes a correspondence between the discovery parameter of the second terminal and a session identifier of the first session.

Through implementation of the method, the session management network element may fully use the discovery parameter of the second terminal and the SUPI of the second terminal that are stored in the DDNMF network element, to obtain the correspondence between the discovery parameter of the second terminal and the identifier of the second bearer.

In a possible implementation of the first aspect, the fifth information may further include an identifier of the first application. Before receiving the fifth information, the session management network element may further receive sixth information from the second terminal, where the sixth information includes the identifier of the first application and the identifier of the second bearer.

The session management network element may determine the identifier of the second bearer based on the SUPI of the second terminal, the identifier of the first application, and the sixth information, to establish the correspondence between the discovery parameter of the second terminal and the identifier of the second bearer.

Through implementation of the method, when there are a plurality of bearers that are established for a D2D communication service of the second terminal, the identifier of the second bearer may be further accurately determined based on the identifier of the first application.

In a possible implementation of the first aspect, the second bearer is the QoS flow. That the session management network element establishes the correspondence between the discovery parameter of the second terminal and the identifier of the second bearer based on the SUPI of the second terminal may include the following steps:

The session management network element may determine the first session of the second terminal based on the SUPI of the second terminal; and the session management network element may further establish a first QoS flow of the first session based on the discovery parameter of the second terminal, to establish a correspondence between the discovery parameter of the second terminal and the QoS flow identifier of the first QoS flow.

Through implementation of the method, the second bearer is the QoS flow, so that configuration and forwarding at a QoS flow granularity can be supported.

Optionally, the fifth information may further include indication information indicating to establish the QoS flow. The session management network element establishes the first QoS flow of the first session based on the indication information and the discovery parameter of the second terminal.

In a possible implementation of the first aspect, the first message may further include the identifier of the first bearer, and the first bearer may be the session or the QoS flow.

Through implementation of the method, the session management network element may quickly obtain the identifier of the first bearer via the first message.

In a possible implementation of the first aspect, the first bearer is the QoS flow, and the session management network element may pre-establish a second QoS flow of a second session of the first terminal based on seventh information, and obtain a correspondence between the seventh information and a QoS flow identifier of the second QoS flow. The seventh information may include the identifier of the first application and/or an application layer identifier of the first terminal.

The first message received by the session management network element further includes the seventh information and a session identifier of the first terminal, and the session identifier of the first terminal identifies the second session of the first terminal. The session management network element determines, based on the seventh information and the session identifier of the first terminal, that the identifier of the first bearer is the identifier of the second QoS flow of the second session.

Through implementation of the method, the second QoS flow of the second session of the first terminal is pre-established, and the session management network element may quickly obtain the identifier of the first bearer based on the first message.

In a possible implementation of the first aspect, the first bearer is the QoS flow. The first message further includes seventh information and a session identifier of the first terminal, the seventh information includes the identifier of the first application and/or an application layer identifier of the first terminal, the session identifier of the first terminal identifies a second session of the first terminal, and the session management network element may establish a second QoS flow of the second session based on the seventh information, and determine an identifier of the second QoS flow as the identifier of the first bearer. Alternatively, the first message further includes the discovery parameter of the second terminal and a session identifier of the first terminal, the session identifier of the first terminal identifies a second session, and the session management network element may establish a second QoS flow of the second session based on the discovery parameter of the second terminal, and determine an identifier of the second QoS flow as the identifier of the first bearer.

Through implementation of the method, after receiving the first message, the session management network element may establish, as required, the second QoS flow for transmitting the data of the first application for the first terminal, to obtain the identifier of the first bearer.

In a possible implementation of the first aspect, the first message further includes second indication information, and the second indication information indicates to establish the QoS flow. The session management network element establishes the second QoS flow of the second session based on the second indication information.

According to a second aspect, an embodiment of this application provides a data communication method. The method may be performed by an access network device or a component (for example, a processor, a chip, or a chip system) of the access network device. The data communication method may include: The access network device receives first information from a session management network element, where the first information includes an identifier of a first bearer and an identifier of a second bearer, the first bearer is for transmitting data of a first application for a first terminal, and the second bearer is for transmitting the data of the first application for a second terminal.

The access network device may directly forward the data of the first application between the first terminal and the second terminal based on the identifier of the first bearer and the identifier of the second bearer.

Through implementation of the method described in the second aspect, the access network device directly forwards the data of the first application between the first terminal and the second terminal, so that communication between two terminals that are far away from each other can be implemented, and the data is not transmitted through a core network, to ensure that a delay of transmitting the data of the first application between the first terminal and the second terminal is not high.

In a possible implementation of the second aspect, both the first bearer and the second bearer are sessions; or both the first bearer and the second bearer are QoS flows.

In a possible implementation of the second aspect, the access network device receives, on the first bearer, the data that is of the first application and that is sent by the first terminal, determines the identifier of the second bearer based on the identifier of the first bearer, and sends the data of the first application to the second terminal on the second bearer. Alternatively, the access network device receives, on the second bearer, the data that is of the first application and that is sent by the second terminal, determines the identifier of the first bearer based on the identifier of the second bearer, and sends the data of the first application to the first terminal on the first bearer.

Through implementation of the method, the access network device may directly forward the data of the first application between the first terminal and the second terminal based on the identifier of the first bearer and the identifier of the second bearer, and the data may not be transmitted through the core network, to reduce a data transmission delay.

According to a third aspect, an embodiment of this application provides a data communication method. The method may be performed by a first terminal or a component (for example, a processor, a chip, or a chip system) of the first terminal. The data communication method may include: The first terminal obtains an identifier of a second terminal, and sends eighth information to an access and mobility management network element, where the eighth information includes the identifier of the second terminal. Optionally, the eighth information is used by the access and mobility management network element to send a first message, the first message includes the identifier of the second terminal, and the first message requests to perform communication of a first application between the first terminal and the second terminal.

Through implementation of the method described in the third aspect, the first terminal may discover the second terminal through a core network.

In a possible implementation of the third aspect, the identifier of the second terminal may be an application layer identifier of the second terminal or a discovery parameter of the second terminal, the application layer identifier of the second terminal is an identifier of the second terminal in the first application, and the discovery parameter of the second terminal corresponds to the application layer identifier of the second terminal in the first application.

In a possible implementation of the third aspect, the identifier of the second terminal is the discovery parameter of the second terminal, and an obtaining manner in which the first terminal obtains the identifier of the second terminal may include: The first terminal obtains the discovery parameter of the second terminal and third indication information from a DDNMF network element, where the third indication information indicates to discover the second terminal through the core network by using the discovery parameter of the second terminal. The third indication information may be obtained by the DDNMF network element from the second terminal, or may be determined by the DDNMF network element based on subscription information of the second terminal.

The first terminal may send the eighth information to the access and mobility management network element based on the third indication information, to discover the second terminal through the core network.

Through implementation of the method, the first terminal may send, to the core network based on the third indication information obtained from the DDNMF network element, the eighth information including the discovery parameter of the second terminal, to discover the second terminal through the core network.

According to a fourth aspect, an embodiment of this application provides a data communication method. The method may be performed by a second terminal or a component (for example, a processor, a chip, or a chip system) of the second terminal. The data communication method may include: The second terminal obtains an identifier of the second terminal, and sends the identifier of the second terminal to a session management network element, where the identifier of the second terminal is used by the session management network element to obtain a correspondence between the identifier of the second terminal and an identifier of a second bearer, and the second bearer is for transmitting data of a first application for the second terminal.

Through implementation of the method described in the fourth aspect, the second terminal sends the identifier of the second terminal to the session management network element, so that the session management network element obtains the correspondence between the identifier of the second terminal and the identifier of the second bearer. Therefore, after subsequently receiving the identifier of the second terminal, the session management network element can quickly obtain the identifier of the second bearer based on the correspondence.

In a possible implementation of the fourth aspect, the identifier of the second terminal is an application layer identifier of the second terminal or a discovery parameter of the second terminal, the application layer identifier of the second terminal is an identifier of the second terminal in the first application, and the discovery parameter of the second terminal corresponds to the application layer identifier of the second terminal in the first application.

In a possible implementation of the fourth aspect, the identifier of the second terminal is the discovery parameter of the second terminal, and the second terminal may further send third indication information to a DDNMF network element. For example, if the second terminal expects that an access network device locally forwards the data of the first application, the second terminal may send the third indication information to the DDNMF network element when obtaining the discovery parameter of the second terminal.

Alternatively, the second terminal may receive the third indication information from the DDNMF network element. For example, when allocating the discovery parameter to the second terminal, the DDNMF network element determines, based on subscription information of the second terminal, that the data of the first application can be locally forwarded by the access network device, and sends the third indication information to the second terminal.

The second terminal may send the identifier of the second terminal to the session management network element based on the third indication information. The third indication information indicates to discover the second terminal through a core network by using the discovery parameter of the second terminal.

Through implementation of the method, the third indication information may indicate to discover the second terminal through the core network by using the discovery parameter of the second terminal, so that the second terminal sends the identifier of the second terminal to the session management network element.

According to a fifth aspect, an embodiment of this application provides a data communication method. The method may be performed by a DDNMF network element or a component (for example, a processor, a chip, or a chip system) of the DDNMF network element. The data communication method may include: The DDNMF network element receives a third message, where the third message requests a discovery parameter of a second terminal. The DDNMF network element may send the discovery parameter of the second terminal and third indication information to a first terminal, where the third indication information indicate to discover the second terminal through a core network by using the discovery parameter of the second terminal.

Accordingly, the first terminal may discover the second terminal through the core network based on the third indication information.

Through implementation of the method described in the fifth aspect, the first terminal may discover the second terminal through the core network, to increase a way in which the first terminal discovers the second terminal.

In a possible implementation of the fifth aspect, the DDNMF network element may receive the third indication information from the second terminal. Optionally, if the second terminal expects that an access network device locally forwards data of a first application, the second terminal may send the third indication information when requesting the discovery parameter from the DDNMF network element.

Optionally, the DDNMF network element may further send the third indication information to the first terminal. Accordingly, the first terminal may send, to an access and mobility management network element based on the third indication information, eighth information including the discovery parameter of the second terminal, to discover the second terminal through a core network.

In a possible implementation of the fifth aspect, the DDNMF network element may send the third indication information to the second terminal. Accordingly, the second terminal may send an identifier of the second terminal to a session management network element based on the third indication information.

The third indication information may be determined by the DDNMF network element based on subscription information of the second terminal. For example, the DDNMF network element determines, based on the subscription information of the second terminal, that data of a first application of the second terminal can be locally forwarded by an access network device. In this case, when the second terminal obtains the discovery parameter, the DDNMF network element may send the third indication information to the second terminal.

According to a sixth aspect, an embodiment of this application provides a communication apparatus. The communication apparatus may be a session management network element or a component (for example, a processor, a chip, or a chip system) of the session management network element, and the communication apparatus may include a transceiver unit and a processing unit. The transceiver unit is configured to receive and send a signal, and the processing unit is configured to perform the following operations through the transceiver unit:

receiving a first message, where the first message includes an identifier of a second terminal, and the first message requests to perform communication of a first application between a first terminal and the second terminal; and sending first information to an access network device based on the first message, where the first information includes an identifier of a first bearer and an identifier of a second bearer, the first bearer is for transmitting data of the first application for the first terminal, the second bearer is for transmitting the data of the first application for the second terminal, and the first information is used by the access network device to directly forward the data of the first application between the first terminal and the second terminal.

In a possible implementation of the sixth aspect, the identifier of the second terminal is an application layer identifier of the second terminal or a discovery parameter of the second terminal, the application layer identifier of the second terminal is an identifier of the second terminal in the first application, and the discovery parameter of the second terminal corresponds to the application layer identifier of the second terminal in the first application.

In a possible implementation of the sixth aspect, both the first bearer and the second bearer are sessions.

Alternatively, both the first bearer and the second bearer are quality of service QoS flows.

In a possible implementation of the sixth aspect, the processing unit is configured to obtain the identifier of the second bearer based on the identifier of the second terminal.

The processing unit is configured to perform the following operation through the transceiver unit: sending the first information to the access network device based on the identifier of the second bearer.

In a possible implementation of the sixth aspect, the first message further includes an identifier of the first application. The processing unit is configured to obtain the identifier of the second bearer based on the identifier of the second terminal and the identifier of the first application.

In a possible implementation of the sixth aspect, the identifier of the second terminal is the discovery parameter of the second terminal.

The processing unit is configured to perform the following operations through the transceiver unit: sending a second message to a direct discovery name management function DDNMF network element, where the second message includes the discovery parameter of the second terminal, and the second message requests a subscription permanent identifier SUPI that is of the second terminal and that corresponds to the discovery parameter of the second terminal; and receiving the SUPI of the second terminal from the DDNMF network element.

The processing unit is configured to determine the identifier of the second bearer based on the SUPI of the second terminal.

In a possible implementation of the sixth aspect, the second bearer is the QoS flow.

The processing unit is configured to: determine a first session of the second terminal based on the SUPI of the second terminal; establish a first QoS flow of the first session based on the discovery parameter of the second terminal; and determine a QoS flow identifier of the first QoS flow as the identifier of the second bearer.

In a possible implementation of the sixth aspect, the processing unit is further configured to obtain a correspondence between the identifier of the second terminal and the identifier of the second bearer.

In a possible implementation of the sixth aspect, the processing unit is configured to receive second information from the second terminal through the transceiver unit, where the second information includes the identifier of the second terminal and the identifier of the second bearer.

The processing unit is configured to establish the correspondence between the identifier of the second terminal and the identifier of the second bearer.

In a possible implementation of the sixth aspect, the second bearer is the QoS flow.

The processing unit is configured to receive third information from the second terminal through the transceiver unit, where the third information includes the identifier of the second terminal and a session identifier of the second terminal, and the session identifier identifies a first session of the second terminal.

The processing unit is configured to: establish a first QOS flow of the first session based on the identifier of the second terminal, and establish a correspondence between the identifier of the second terminal and a QoS flow identifier of the first QoS flow.

In a possible implementation of the sixth aspect, the third information further includes first indication information, and the first indication information indicates to establish the QoS flow.

The processing unit is configured to establish the first QoS flow based on the identifier of the second terminal and the first indication information.

In a possible implementation of the sixth aspect, the identifier of the second terminal is the application layer identifier of the second terminal. The processing unit is configured to: receive fourth information from a policy control function PCF network element, where the fourth information includes the application layer identifier of the second terminal and a session management policy association identifier; and establish a correspondence between the application layer identifier of the second terminal and the identifier of the second bearer based on the session management policy association identifier.

In a possible implementation of the sixth aspect, the second bearer is the QoS flow. The processing unit is configured to: determine a first session of the second terminal based on the session management policy association identifier; establish a first QoS flow of the first session based on the application layer identifier of the second terminal; and establish a correspondence between the application layer identifier of the second terminal and a QoS flow identifier of the first QoS flow.

In a possible implementation of the sixth aspect, the identifier of the second terminal is the discovery parameter of the second terminal. The processing unit is configured to receive fifth information from a DDNMF network element through the transceiver unit, where the fifth information includes the discovery parameter of the second terminal and an SUPI of the second terminal.

The processing unit is configured to establish a correspondence between the discovery parameter of the second terminal and the identifier of the second bearer based on the SUPI of the second terminal.

In a possible implementation of the sixth aspect, the fifth information further includes an identifier of the first application. The processing unit is further configured to receive sixth information from the second terminal through the transceiver unit, where the sixth information includes the identifier of the first application and the identifier of the second bearer.

The processing unit is configured to: determine the identifier of the second bearer based on the SUPI of the second terminal, the identifier of the first application, and the sixth information; and establish the correspondence between the discovery parameter of the second terminal and the identifier of the second bearer.

In a possible implementation of the sixth aspect, the second bearer is the QoS flow. The processing unit is configured to: determine a first session of the second terminal based on the SUPI of the second terminal; establish a first QoS flow of the first session based on the discovery parameter of the second terminal; and establish a correspondence between the discovery parameter of the second terminal and a QoS flow identifier of the first QoS flow.

In a possible implementation of the sixth aspect, the first message further includes the identifier of the first bearer.

In a possible implementation of the sixth aspect, the first bearer is the QOS flow, the first message further includes seventh information and a session identifier of the first terminal, the session identifier of the first terminal identifies a second session, and the seventh information includes the identifier of the first application and/or an application layer identifier of the first terminal.

The processing unit is further configured to determine, based on the seventh information and the session identifier of the first terminal, that the identifier of the first bearer is an identifier of a second QoS flow of the second session.

In a possible implementation of the sixth aspect, the first bearer is the QoS flow.

The first message further includes seventh information and a session identifier of the first terminal, the seventh information includes the application identifier and/or an application layer identifier of the first terminal, the session identifier of the first terminal identifies a second session, and the processing unit is further configured to establish a second QoS flow of the second session based on the seventh information; or the first message further includes the discovery parameter of the second terminal and a session identifier of the first terminal, the session identifier of the first terminal identifies a second session, and the processing unit is further configured to establish a second QoS flow of the second session based on the discovery parameter of the second terminal.

The processing unit is further configured to determine a QoS flow identifier of the second QoS flow as the identifier of the first bearer.

In a possible implementation of the sixth aspect, the first message further includes second indication information, and the second indication information indicates to establish the QoS flow.

According to a seventh aspect, an embodiment of this application provides a communication apparatus. The communication apparatus may be an access network device or a component (for example, a processor, a chip, or a chip system) of the access network device, and the communication apparatus may include a transceiver unit and a processing unit. The transceiver unit is configured to receive and send a signal, and the processing unit is configured to perform the following operations through the transceiver unit:

receiving first information from a session management network element, where the first information includes an identifier of a first bearer and an identifier of a second bearer, the first bearer is for transmitting data of a first application for a first terminal, and the second bearer is for transmitting the data of the first application for a second terminal; and directly forwarding the data of the first application between the first terminal and the second terminal based on the identifier of the first bearer and the identifier of the second bearer.

In a possible implementation of the seventh aspect, both the first bearer and the second bearer are sessions.

Alternatively, both the first bearer and the second bearer are QoS flows.

In a possible implementation of the seventh aspect, the processing unit is configured to: receive the data of the first application on the first bearer through the transceiver unit, determine the identifier of the second bearer based on the identifier of the first bearer, and send the data of the first application on the second bearer; or receive the data of the first application on the second bearer, determine the identifier of the first bearer based on the identifier of the second bearer, and send the data of the first application on the first bearer.

According to an eighth aspect, an embodiment of this application provides a communication apparatus. The communication apparatus may be a first terminal or a component (for example, a processor, a chip, or a chip system) of the first terminal, and the communication apparatus may include a transceiver unit and a processing unit. The transceiver unit is configured to receive and send a signal, and the processing unit is configured to perform the following operations through the transceiver unit:

obtaining an identifier of a second terminal; and sending eighth information to an access and mobility management network element, where the eighth information includes the identifier of the second terminal, the eighth information is used by the access and mobility management network element to send a first message, the first message includes the identifier of the second terminal, and the first message requests to perform communication of a first application between the first terminal and the second terminal.

In a possible implementation of the eighth aspect, the identifier of the second terminal is an application layer identifier of the second terminal or a discovery parameter of the second terminal, the application layer identifier of the second terminal is an identifier of the second terminal in the first application, and the discovery parameter of the second terminal corresponds to the application layer identifier of the second terminal in the first application.

In a possible implementation of the eighth aspect, the identifier of the second terminal is the discovery parameter of the second terminal.

The processing unit is configured to obtain the discovery parameter of the second terminal and third indication information from a direct discovery name management function DDNMF network element through the transceiver unit, where the third indication information indicates to discover the second terminal through a core network by using the discovery parameter of the second terminal.

The processing unit is configured to send the eighth information to the access and mobility management network element based on the third indication information through the transceiver unit.

According to a ninth aspect, an embodiment of this application provides a communication apparatus. The communication apparatus may be a second terminal or a component (for example, a processor, a chip, or a chip system) of the second terminal, and the communication apparatus may include a transceiver unit and a processing unit. The transceiver unit is configured to receive and send a signal, and the processing unit is configured to perform the following operations through the transceiver unit:

obtaining an identifier of the second terminal; and sending the identifier of the second terminal to a session management network element, where the identifier of the second terminal is used by the session management network element to obtain a correspondence between the identifier of the second terminal and an identifier of a second bearer, and the second bearer is for transmitting data of a first application for the second terminal.

In a possible implementation of the ninth aspect, the identifier of the second terminal is an application layer identifier of the second terminal or a discovery parameter of the second terminal, the application layer identifier of the second terminal is an identifier of the second terminal in the first application, and the discovery parameter of the second terminal corresponds to the application layer identifier of the second terminal in the first application.

In a possible implementation of the ninth aspect, the identifier of the second terminal is the discovery parameter of the second terminal.

The processing unit is further configured to perform the following operation through the transceiver unit: sending third indication information to a direct discovery name management function DDNMF network element; or receiving third indication information from a DDNMF network element.

The processing unit is configured to perform the following operation through the transceiver unit: sending the identifier of the second terminal to the session management network element based on the third indication information.

The third indication information indicates to discover the second terminal through a core network by using the discovery parameter of the second terminal.

According to a tenth aspect, an embodiment of this application provides a communication apparatus. The communication apparatus may be a DDNMF network element or a component (for example, a processor, a chip, or a chip system) of the DDNMF network element, and the communication apparatus may include a transceiver unit and a processing unit. The transceiver unit is configured to receive and send a signal, and the processing unit is configured to perform the following operations through the transceiver unit:

receiving a third message, where the third message requests a discovery parameter of a second terminal; and sending the discovery parameter of the second terminal and third indication information to a first terminal, where the third indication information indicates to discover the second terminal through a core network by using the discovery parameter of the second terminal.

In a possible implementation of the tenth aspect, the processing unit is further configured to perform the following operation through the transceiver unit: receiving the third indication information from the second terminal.

In a possible implementation of the tenth aspect, the processing unit is further configured to perform the following operation through the transceiver unit: sending the third indication information to the second terminal.

According to an eleventh aspect, an embodiment of this application provides a communication apparatus, including a processor. The processor is coupled to a memory, and may be configured to execute instructions in the memory, to implement the method according to any one of the first aspect to the fifth aspect. Optionally, the communication apparatus further includes the memory. Optionally, the communication apparatus further includes a communication interface, and the processor is coupled to the communication interface.

According to a twelfth aspect, an embodiment of this application provides a processor, including an input circuit, an output circuit, and a processing circuit. The processing circuit is configured to receive a signal through the input circuit, and transmit a signal through the output circuit, to enable the processor to perform the method according to any one of the first aspect to the fifth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a thirteenth aspect, an embodiment of this application provides a processing apparatus, including a processor and a memory. The processor is configured to read instructions stored in the memory, receive a signal through a receiver, and transmit a signal through a transmitter, to perform the method according to any one of the first aspect to the fifth aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated into one chip, or may be separately disposed in different chips. A type of the memory and a manner in which the memory and the processor are disposed are not limited in this embodiment of this application.

It should be understood that a related data exchange process, for example, sending an identifier of a second terminal, may be a process of outputting the identifier of the second terminal from the processor, and receiving a first message may be a process of receiving the first message by the processor. In some embodiments, data output by the processor may be output to the transmitter, and input data received by the processor may be from the receiver. The transmitter and the receiver may be collectively referred to as a transceiver.

The processing apparatus in the thirteenth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a fourteenth aspect, an embodiment of this application provides a computer program product. The computer program product includes a computer program (which may also be referred to as code or instructions). When the computer program is run, a computer is enabled to perform the method according to any one of the first aspect to the fifth aspect.

According to a fifteenth aspect, an embodiment of this application provides a readable storage medium. The readable storage medium stores a computer program (which may also be referred to as code or instructions). When the computer program is run on a computer, the method according to any one of the first aspect to the fifth aspect is implemented.

According to a sixteenth aspect, an embodiment of this application provides a communication system, including the foregoing session management network element and the foregoing access network device.

Optionally, the communication system may further include a first terminal.

Optionally, the communication system may further include a second terminal.

Optionally, the communication system may further include a DDNMF network element.

According to a seventeenth aspect, a chip system is provided. The chip system includes a processor and an interface circuit. The processor is configured to invoke, from a memory, a computer program (which may also be referred to as code or instructions) stored in the memory and run the computer program, to implement a function in any one of the first aspect to the fifth aspect. In a possible design, the chip system further includes the memory, and the memory is configured to store program instructions and data. The chip system may include a chip, or may include a chip and another discrete component.

DESCRIPTION OF EMBODIMENTS

Technical solutions in embodiments of this application may be applied to various communication systems, for example, a long term evolution (LTE) system, a universal mobile telecommunications system (UMTS), a 5th generation (5G) system, a new radio (NR) system, and another new system emerging with development of technologies.

Figure 1A:
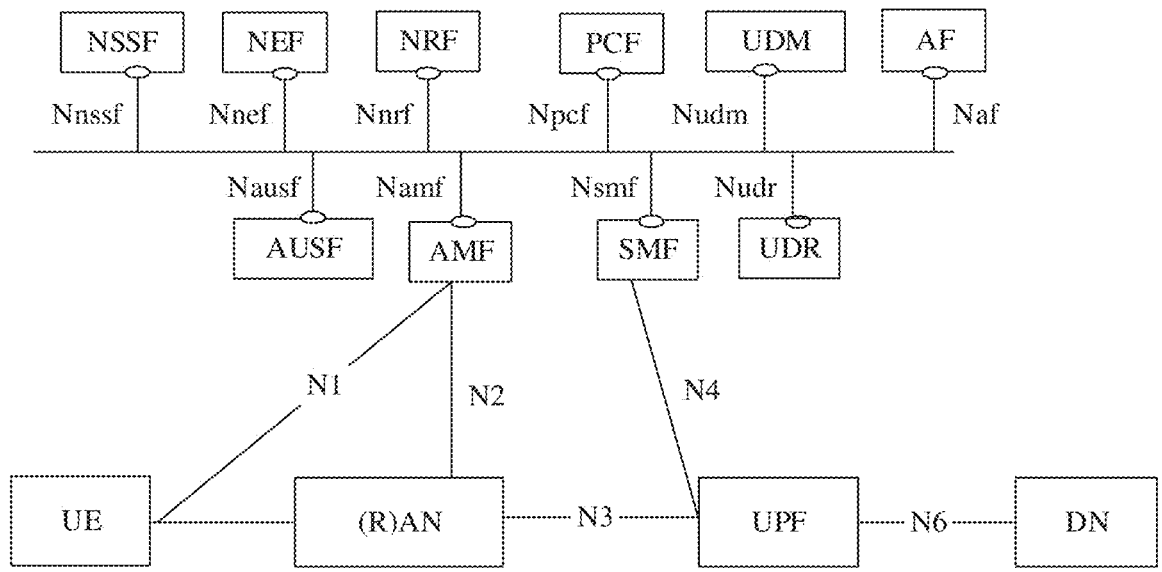
FIG. 1A is a diagram of a 5G system architecture according to this application.

FIG. 1A is a diagram of a 5G system architecture that can be used in this application. As shown in FIG. 1A, network functions and entities included in the 5G system architecture mainly include user equipment (UE), an access network (RAN) device, a user plane function (UPF), an access and mobility management function (AMF), a session management function (SMF), a data network (DN), and the like. FIG. 1A shows interaction relationships between network functions and entities and corresponding interfaces. For example, the UE and the AMF may interact with each other through an N1 interface, and an interaction message may be referred to as an N1 message. Some interfaces are implemented as service-oriented interfaces.

The following separately describes the network functions and entities included in the network architecture shown in FIG. 1A.

The UE may also be referred to as a terminal, including but not limited to a handheld terminal, a notebook computer, a cellular phone, a smartphone, a tablet computer, a handheld device, an augmented reality (AR) device, a virtual reality (VR) device, a machine type communication terminal, or another device that can access a network. The terminal and the access network device communicate with each other using an air interface technology (for example, an NR or LTE technology). Alternatively, terminals may communicate with each other using an air interface technology (for example, an NR or LTE technology). In internet of vehicles communication, a communication terminal carried on a vehicle may be a terminal, and a road side unit (RSU) may also be used as a terminal. A communication terminal on an uncrewed aerial vehicle may also be considered as a terminal.

The access network (RAN) device is mainly responsible for functions such as radio resource management, quality of service management, and data compression and encryption on an air interface side. The access network device may include various forms of base stations, such as a macro base station, a micro base station, a relay station, and an access point. In systems using different radio access technologies, a device having a base station function may have different names. For example, in a 5th generation (5G) system, the device is referred to as a gNB.

An access and mobility management function (AMF) network element belongs to a core network element, and is mainly responsible for signaling processing, for example, functions such as access control, mobility management, attachment and detachment, and gateway selection. In a case in which the AMF network element provides a service for a session in the terminal, the AMF network element provides a control plane storage resource for the session, to store a session identifier, an SMF network element identifier associated with the session identifier, and the like.

A session management function (SMF) network element is responsible for user plane network element selection, user plane network element redirection, internet protocol (IP) address assignment, bearer establishment, modification, and release, and QoS control.

A user plane function (UPF) network element is responsible for forwarding and receiving user data on the terminal. The UPF network element may receive the user data from a data network, and transmit the user data to the terminal through the access network device. Alternatively, the UPF network element may receive the user data from the terminal through the access network device, and forward the user data to a data network. A transmission resource and a scheduling function in the UPF network element that provide a service for the terminal are managed and controlled by the SMF network element.

A network exposure function (NEF) network element mainly supports secure interaction between a 3GPP network and a third-party application.

An application function (AF) network element mainly supports interaction with a 3GPP core network to provide a service, for example, to affect a data routing decision and a policy control function, or provide some third-party services for a network side.

A policy control function (PCF) network element is responsible for a policy control decision, provides a policy rule of a control plane function, and provides a traffic-based charging control function.

A network slice selection function (NSSF) network element is mainly responsible for network slice selection, and determines, based on slice selection assistance information of the UE, subscription information, and the like, a network slice instance that is allowed to be accessed by the UE.

A unified data management (UDM) network element is mainly responsible for subscription data management of the UE, including storage and management of a UE identifier, access authorization of the UE, and the like.

An authentication server function (AUSF) supports 3GPP and non-3GPP access authentication.

A network repository function (NRF) network element supports network function registration and discovery.

A unified data repository (UDR) stores and obtains subscription data used by the UDM and the PCF.

The data network (DN) is a network that provides a user with a data transmission service, for example, an IP multimedia service (IMS) or the internet.

The UE, the (R)AN, the UPF, and the DN in FIG. 1A may be referred to as data plane network functions and entities. Data traffic of a user may be transmitted through a session established between the UE and the DN, and the data traffic is transmitted through two network function entities: the (R)AN and the UPF. Other parts in the network architecture may be referred to as control plane network functions and entities, and are mainly responsible for functions such as authentication and authorization, registration management, session management, mobility management, and policy control, to implement reliable and stable transmission of user-layer traffic.

Figure 1B:
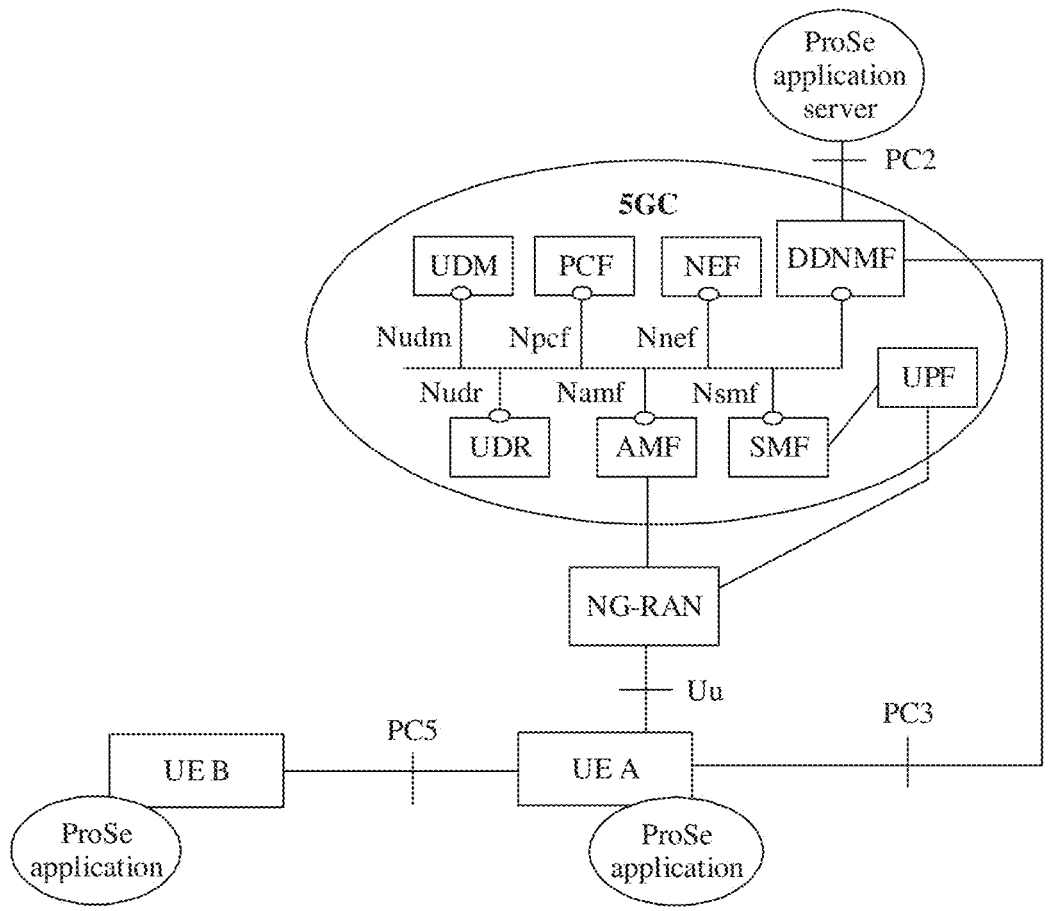
FIG. 1B shows a 5G ProSe network architecture according to this application.

FIG. 1B is a diagram of another 5G ProSe system architecture that may be used in this application. The diagram of the 5G ProSe system architecture may show a 5G network architecture used for D2D communication. As shown in FIG. 1B, in the 5G ProSe system architecture, a direct discovery name management function (DDNMF) network element may be introduced based on the 5G system architecture shown in FIG. 1A, to support a D2D-related function. The DDNMF may also be referred to as a 5G DDNMF. Main functions of the DDNMF include a function of allocating, to UE, a parameter used for D2D discovery and a function of interacting with another core network element. In the 5G ProSe system architecture shown in FIG. 1B, D2D communication may be performed between UEs through a PC5 interface. The DDNMF communicates with the UE through a proximity service communication 3 (ProSe Communication 3, PC3) interface, and the PC3 interface may be implemented by using a user plane or a control plane.

It should be understood that, embodiments of this application are not limited to being applied to the system architectures shown in FIG. 1A and FIG. 1B. For example, a communication system to which the data communication method in embodiments of this application may be applied may include more or fewer network elements or devices. The devices or the network elements in FIG. 1A and FIG. 1B may be hardware, or may be software obtained through function division or a combination thereof. The devices or the network elements in FIG. 1A and FIG. 1B may communicate with each other through another device or network element.

Before the method in this application is described in detail, some concepts in this application are first briefly described.

1. Discovery Parameter

The discovery parameter in embodiments of this application is a parameter used for mutual discovery between two terminals that perform D2D communication, for example, a proximity service restricted code (ProSe Restricted Code) used in a D2D discovery mechanism.

The following describes, with reference to the D2D discovery mechanism, the discovery parameter by using an example.

In the D2D communication discovery mechanism, there are two discovery types, namely, open discovery and restricted discovery. In the open discovery, any UE that is authorized by a D2D service and that is interested in a D2D application may apply for a D2D discovery parameter corresponding to the D2D application, to monitor whether there is UE that is broadcasting a corresponding D2D discovery parameter nearby. If there is the UE, the UE is discovered. In the restricted discovery, according to different application requirements (for example, determined by a D2D application), only some UEs may be qualified to perform node discovery, in other words, an application service can be used by only some UEs, for example, only UEs authorized by an application server.

There are two discovery modes in the D2D communication discovery mechanism, namely, a D2D communication mode A and a D2D communication mode B. In the D2D communication mode A, the UE may be classified into announcing UE and monitoring UE. The D2D communication mode A supports the open discovery and the restricted discovery. In the D2D communication mode B, the UE may be classified into discoverer UE and discoveree UE. The D2D communication mode B supports only the restricted discovery.

Figure 2:
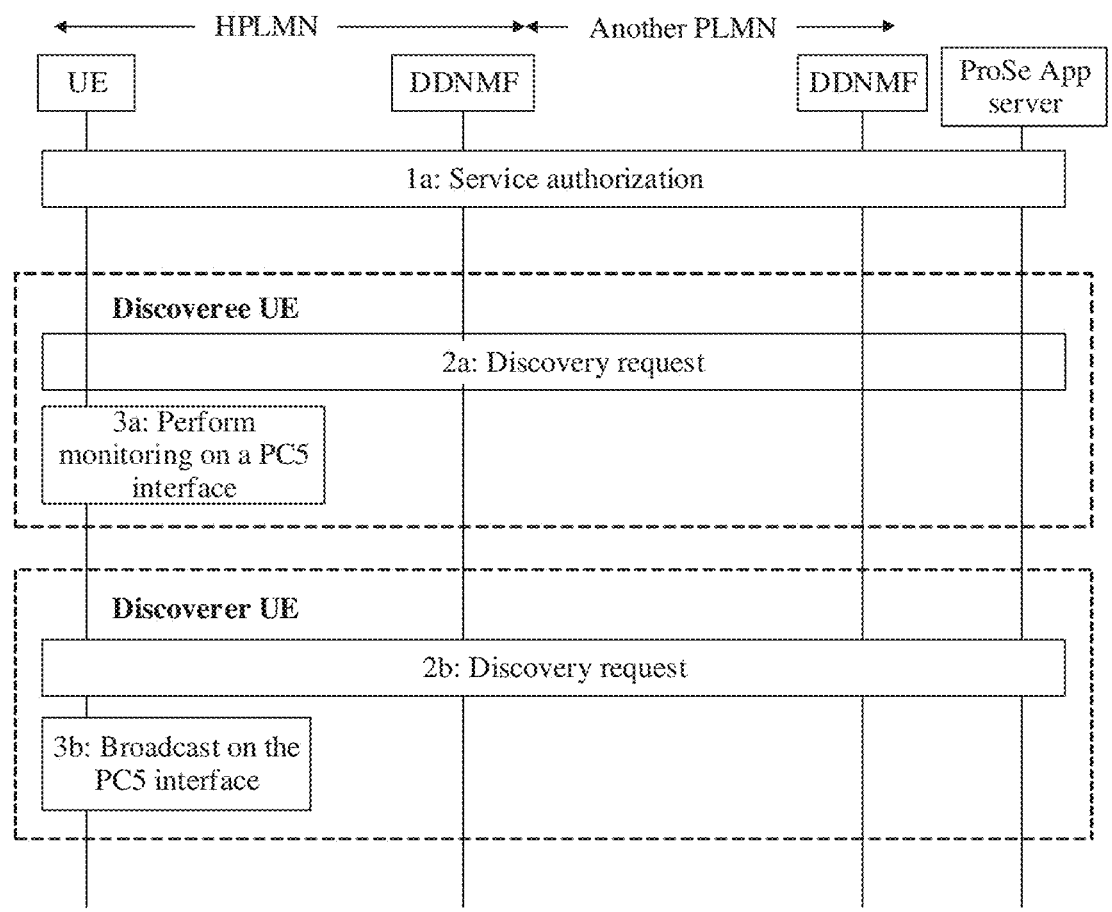
FIG. 2 is a schematic flowchart of a D2D discovery mechanism according to this application.

The following provides descriptions by using the D2D communication mode B as an example. As shown in FIG. 2, a restricted discovery procedure in the D2D communication mode B may include but is not limited to the following step 1a, step 2a, step 2b, step 3a, and step 3b. It may be understood that an execution sequence of step 1a, step 2a, step 2b, step 3a, and step 3b is not limited.

Step 1a: UE performs service authorization.

Step 2a: Discoveree UE sends a discovery request message to a DDNMF, to request a discovery parameter. For example, the discovery parameter may be a proximity service restricted code (ProSe Restricted Code).

Step 3a: After obtaining the discovery parameter, the discoveree UE performs monitoring on a PC5 interface. If a discovery parameter broadcast by discoverer UE is received, the discovery parameter from the discoverer UE is compared with the discovery parameter obtained by the discoveree UE. If the two parameters are the same, the discoveree UE reports the discovery parameter to the DDNMF, and performs a subsequent D2D communication connection procedure with the discoverer UE such that the discoverer UE discovers the discoveree UE through the PC5 interface.

Step 2b: The discoverer UE sends a discovery request message to the DDNMF, to request the discovery parameter corresponding to the discoveree UE, for example, the ProSe restricted code corresponding to the discoveree UE.

Step 3b: After receiving the discovery parameter corresponding to the discoveree UE, the discoverer UE broadcasts the discovery parameter through the PC5 interface, to discover the discoveree UE through the PC5 interface.

Figure 3:
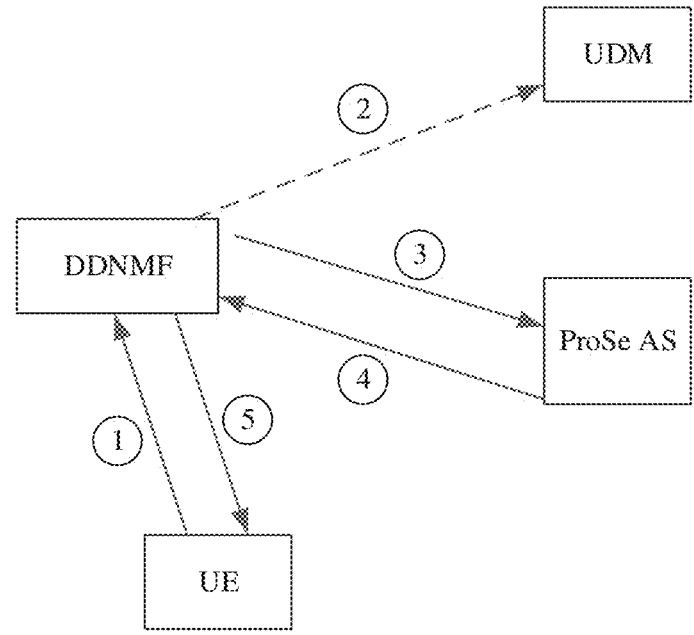
FIG. 3 is a schematic flowchart of obtaining a discovery parameter by discoveree UE according to this application.

The following describes step 2*a* in detail. For details, refer to step 1 to step 5 shown in FIG. 3.

Step 1: The discoveree UE sends a discovery request message to the DDNMF, where the message includes an application layer identifier (for example, a restricted ProSe application user identifier (restricted ProSe application user ID, RPAUID)), a discovery type (which may be restricted discovery), an international mobile subscriber identity (IMSI), and an application identifier (APP ID). A subscription permanent identifier (SUPI) mentioned in embodiments of this application is a type of the IMSI.

Before the discoveree UE sends the discovery request message to the DDNMF, when the discoveree UE registers with a network, the DDNMF allocates a proximity service discovery UE identifier (ProSe Discovery UE ID, PDUID) to the discoveree UE, the DDNMF stores an association between the PDUID and the IMSI, the discoveree UE sends the PDUID to a proximity service application server (ProSe Application Server, ProSe AS), the ProSe AS allocates the application layer identifier RPAUID to the PDUID, and the ProSe AS records a binding relationship between the PDUID and the RPAUID.

Step 2: The DDNMF searches, based on the IMSI of the discoveree UE, for subscription authorization information of the discoveree UE. If the DDNMF does not find the subscription authorization information of the discoveree UE, the DDNMF obtains the subscription authorization information of the discoveree UE from a UDM, to determine, based on the subscription authorization information of the discoveree UE, whether the discoveree UE can perform D2D discovery.

Step 3: When the DDNMF determines that the discoveree UE can perform D2D discovery, the DDNMF determines the ProSe AS based on the APP ID. The DDNMF sends an authorization request message to the ProSe AS, where the message includes the RPAUID and a request type Request Type. The request type may be restricted discovery Restricted discovery.

Step 4: The ProSe AS determines the PDUID based on the RPAUID in the authorization request message, and sends a request response message to the DDNMF, where the request response message includes the PDUID.

Step 5: The DDNMF allocates a discovery parameter (for example, a ProSe restricted code) and corresponding validity time to the discoveree UE. The DDNMF binds a correspondence between the RPAUID and the discovery parameter. After determining that the validity time of the discovery parameter expires, the DDNMF deletes the correspondence.

Figure 4:
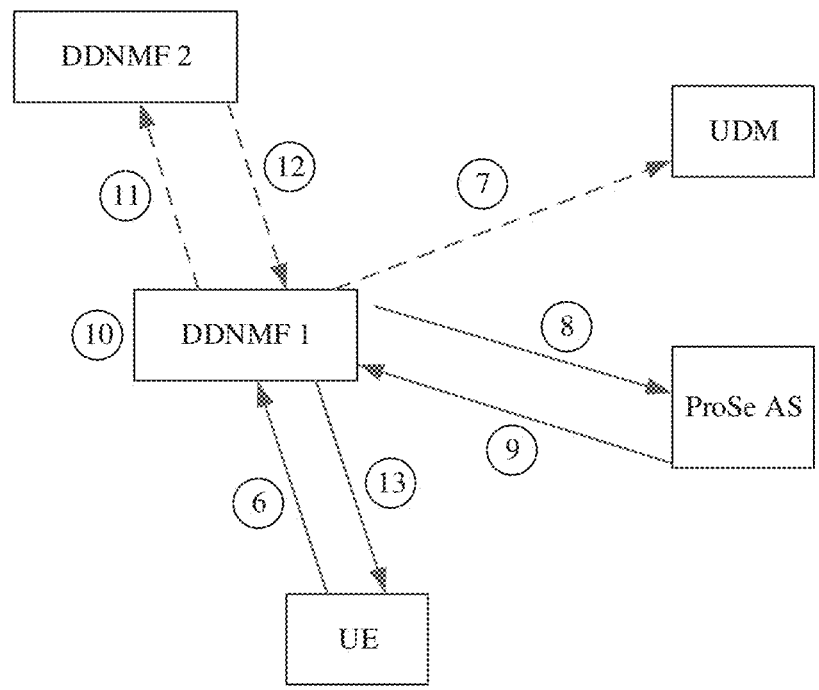
FIG. 4 is a schematic flowchart of obtaining a discovery parameter by discoverer UE according to this application.

The following describes step 2*b* in detail. For details, refer to step 6 to step 13 shown in FIG. 4.

Step 6: The discoverer UE sends a discovery request (for example, a discovery request) message to a DDNMF 1, where the message includes an RPAUID, a discovery type Discovery type (for example, restricted discovery), an IMSI, an APP ID, and a target RPAUID. The target RPAUID is an application layer identifier of UE that is to be discovered, namely, an application layer identifier of the discoveree UE. The discoverer UE may obtain the target RPAUID from the ProSe AS at an application layer. In some embodiments, the target RPAUID may be placed in an application level container for transmission.

Before the discoverer UE sends the discovery request message to the DDNMF 1, when the discoverer UE registers with a network, the DDNMF 1 allocates a PDUID to the discoverer UE, and the discoverer UE sends the allocated PDUID to the ProSe AS. The ProSe AS allocates one RPAUID to the PDUID, and the ProSe AS records a binding relationship between the PDUID and the RPAUID.

Step 7: The DDNMF 1 searches, based on the IMSI of the discoverer UE, for subscription authorization information of the discoverer UE. If the DDNMF 1 does not find the subscription authorization information of the discoverer UE, the DDNMF 1 obtains the subscription authorization information of the discoverer UE from the UDM, to determine, based on the subscription authorization information of the discoverer UE, whether the discoverer UE can perform D2D discovery.

Step 8: The DDNMF 1 determines the ProSe AS based on the APP ID, and sends an authorization request message to the ProSe AS, where the message includes the RPAUID, a request type Request Type, and the target RPAUID. The request type Request Type may be restricted discovery Restricted discovery.

Step 9: The ProSe AS determines corresponding PDUIDs based on the RPAUID in the authorization request message and the target RPAUID, and the ProSe AS sends a request response message to the DDNMF 1, where the request response message includes the PDUID and a correspondence between each target RPAUID and each target PDUID.

Step 10: After the DDNMF 1 obtains the target PDUID, where the PDUID includes information about a PLMN ID, the DDNMF determines, based on the target PDUID, a public land mobile network (PLMN) in which UE that is to be discovered is located.

Step 11: The DDNMF 1 requests, from a DDNMF 2 corresponding to the information about the PLMN ID in the target PDUID, a discovery parameter corresponding to the target RPAUID, where the DDNMF 2 may be a DDNMF in FIG. 3.

Step 12: The DDNMF 2 sends a response message to the DDNMF 1, where the response message includes the discovery parameter corresponding to the target RPAUID and corresponding validity time.

Step 13: After the DDNMF 1 obtains the discovery parameter corresponding to the target RPAUID and the corresponding validity time, the DDNMF 1 sends the discovery parameter corresponding to the target RPAUID and the corresponding validity time to the discoverer UE.

It may be understood that the data communication method in embodiments of this application may be applied to the D2D communication mode A or the D2D communication mode B. This is not limited herein.

2. Quality of Service (QOS) Flow

One session may include one or more QoS flows. In a 5G system, one QoS flow identifier (QFI) identifies one QoS flow. Same forwarding processing (for example, same scheduling or a same admission threshold) may be performed on user plane data with a same QFI in the session. The QoS flow may be controlled by an SMF, and may be preconfigured or established through a session establishment or modification procedure.

3. Session Management Policy Association Identifier (SM Policy Association ID)

In embodiments of this application, the session management policy association identifier is for uniquely determining a session between a PCF and an SMF. In some embodiments, in a session establishment process, the SMF allocates an IP address to UE for the established session, and the IP address is associated with the session. The SMF sends the IP address and a session identifier to the PCF. The PCF allocates the session management policy association identifier (SM Policy Association ID) to the session identifier, and sends the session management policy association identifier to the SMF. The SMF establishes a correspondence between the session management policy association identifier and the session identifier. In addition, the PCF stores a correspondence among an IP address, a session identifier, and a session management policy association identifier.

4. The term "and/or" in this specification describes only an association relationship for describing associated objects and indicates that three relationships may exist. For example, A and/or B may indicate the following three cases: Only A exists, both A and B exist, and only B exists.

Figure 5:
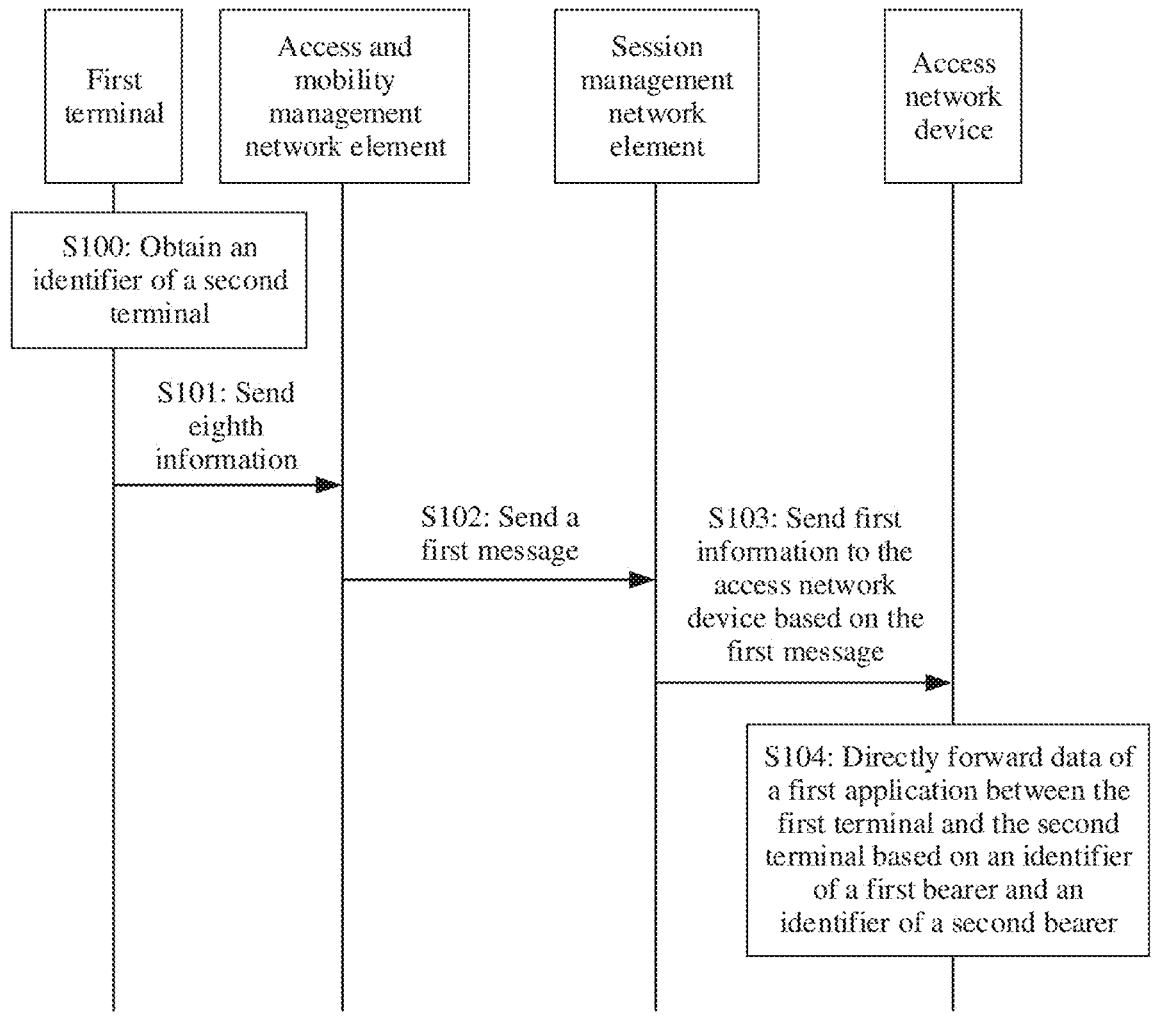
FIG. 5 is a schematic flowchart of a data communication method according to this application.

FIG. 5 is a schematic flowchart of a data communication method according to an embodiment of this application. FIG. 1A or FIG. 1B may be an example of a network architecture in this scenario. As shown in FIG. 5, the method may include S102, S103, and S104. Optionally, the method may further include S100 and S101. An execution sequence of S100, S101, S102, S103, and S104 is not limited in this embodiment of this application. As shown in the figure, the data communication method in this embodiment of this application includes but is not limited to the following steps.

S100: A first terminal obtains an identifier of a second terminal.

Optionally, the first terminal is discoverer UE, and the second terminal is discoveree UE.

Optionally, in an implementation, when a user corresponding to an application layer identifier of the first terminal communicates with a user corresponding to an application layer identifier of the second terminal, step S100 is performed.

The application layer identifier of the first terminal may be an identifier of the first terminal in a first application, for example, an application layer identifier that is of the first terminal and that is used for login or used in the first application. Correspondingly, the application layer identifier of the second terminal may be an identifier of the second terminal in the first application, for example, an application layer identifier that is of the second terminal and that is used for login or used in the first application. The first application may be an application used for D2D communication, or certainly may be another application. This is not limited in this application.

The identifier of the second terminal may be the application layer identifier of the second terminal or a discovery parameter of the second terminal. Optionally, the application layer identifier in this embodiment of this application is an RPAUID. The discovery parameter of the second terminal corresponds to the application layer identifier of the second terminal in the first application.

The application layer identifier of the second terminal may be obtained by an application layer of the first terminal and sent to a network layer of the first terminal. For example, the application layer identifier of the second terminal is bound to the first application installed on the second terminal. When the first application of the second terminal is started, an application layer of the second terminal obtains the application layer identifier of the second terminal. When the user corresponding to the application layer identifier of the first terminal communicates with the user corresponding to the application layer identifier of the second terminal, the application layer of the first terminal may obtain the application layer identifier of the second terminal that is obtained by the application layer of the second terminal.

It may be understood that, assuming that the identifier of the second terminal is the discovery parameter of the second terminal, for a manner in which the first terminal obtains the identifier of the second terminal, refer to descriptions of step 2*b* in the D2D discovery mechanism in the foregoing embodiment. The first terminal may be discoverer UE, and the second terminal may be discoveree UE. In some embodiments, the first terminal sends a third message to a DDNMF, where the third message requests the discovery parameter of the second terminal. Correspondingly, the DDNMF sends the discovery parameter of the second terminal to the first terminal. Optionally, the DDNMF further sends third indication information to the first terminal.

The third indication information may indicate that the discovery parameter of the second terminal is allowed to be used and the second terminal is to be discovered through a core network. Alternatively, the third indication information may indicate that the second terminal is to send the discovery parameter of the second terminal to a session management network element, so that the first terminal is allowed to use the discovery parameter of the second terminal and discovers the second terminal through a core network. Alternatively, the third indication information may indicate that a session management network element in a core network is to implement discovery related to the discovery parameter of the second terminal, and an access network device is to locally forward data related to the discovery parameter of the second terminal. The third indication information may be implemented in an explicit manner or an implicit manner. A specific existence form of the third indication information is not limited in this embodiment of this application.

It should be noted that in this embodiment of this application, the access network device performing local forwarding may mean that data is not transmitted through the core network, but is directly forwarded by the access network device. For example, the access network device directly sends data received from the first terminal to the second terminal, or directly sends data received from the second terminal to the first terminal.

It should be noted that the third indication information may be sent by the second terminal to the DDNMF. For example, when the second terminal obtains the discovery parameter of the second terminal from the DDNMF, if the second terminal expects that the access network device locally forwards data of the first application, the second terminal sends the third indication information to the DDNMF; otherwise, the second terminal does not send the third indication information. Alternatively, the third indication information may be determined by the DDNMF based on subscription information of the second terminal when the DDNMF allocates the discovery parameter to the second terminal. For example, if the subscription information of the second terminal indicates that the second terminal can perform communication through local forwarding of the access network device, the DDNMF sends the third indication information to the second terminal. Alternatively, the DDNMF may send the third indication information to the first terminal when the first terminal requests the discovery parameter of the second terminal.

S101: The first terminal sends eighth information to an access and mobility management network element, where the eighth information includes the identifier of the second terminal.

Optionally, the eighth information is used by the access and mobility management network element to send a first message, and the first message requests to perform communication of the first application between the first terminal and the second terminal.

The first message may include the identifier of the second terminal.

The eighth information may be carried in a non-access stratum (NAS) message, for example, a protocol data unit (PDU) session establishment request message or a PDU session modification request message.

Optionally, if the identifier of the second terminal is the discovery parameter of the second terminal, the first terminal may obtain the discovery parameter of the second terminal and the third indication information from the DDNMF, and the first terminal may send the eighth information to the access and mobility management network element based on the third indication information.

For example, assuming that the first terminal does not discover the second terminal when broadcasting the discovery parameter of the second terminal through a PC5 interface, the first terminal may send the eighth information to the access and mobility management network element, to discover the second terminal through the session management network element in the core network.

S102: The access and mobility management network element sends the first message to the session management network element.

For the first message, refer to related descriptions in S101. In some embodiments, the first message may include the identifier of the second terminal.

In some embodiments, the first message is a create session management context request (Create SM Context Request) message, an update session management context (Update SM Context) message, or a newly defined message, for example, an association establishment/modification request message.

S103: The session management network element sends first information to the access network device based on the first message.

The first information may include an identifier of a first bearer and an identifier of a second bearer. The first bearer may be for transmitting the data of the first application for the first terminal, and the second bearer may be for transmitting the data of the first application for the second terminal.

In an example, the session management network element may send the first information to the access network device through the access and mobility management network element. In some embodiments, the session management network element may send the first information to the access and mobility management network element via an update session management context response (Update SM Context Response) message or a session management context status notify (SM Context Status Notify) message. The access and mobility management network element sends the first information to the access network device via an N2 message.

For example, the session management network element may obtain the identifier of the second bearer based on the identifier of the second terminal in the first message. The second bearer may be a bearer that is established for the second terminal and that is for transmitting the data of the first application.

In some embodiments, the second bearer may be a first session or a first QoS flow for transmitting the data of the first application for the second terminal.

The following uses the first optional implementation and the second optional implementation as examples to describe a process in which the session management network element obtains the identifier of the second bearer.

In the first optional implementation, the session management network element obtains and prestores a correspondence between the identifier of the second terminal and the identifier of the second bearer. Further, after receiving the first message and obtaining the identifier of the second terminal that is included in the first message, the session management network element may determine the identifier of the second bearer based on the correspondence.

In some embodiments, the session management network element may obtain the correspondence between the identifier of the second terminal and the identifier of the second bearer in one or more of the following manners 1 to 7.

Manner 1: The session management network element obtains the identifier of the second terminal and the identifier of the second bearer from the second terminal, and establishes the correspondence between the identifier of the second terminal and the identifier of the second bearer.

The identifier of the second terminal may be the application layer identifier of the second terminal or the discovery parameter of the second terminal, and the second bearer may be a QoS flow or a session.

In some embodiments, the second terminal may send second information to the session management network element. The second information may include the identifier of the second terminal and the identifier of the second bearer. The second bearer may be the first session for transmitting the data of the first application for the second terminal, or the second bearer may be the first QoS flow for transmitting the data of the first application for the second terminal.

Correspondingly, the session management network element receives the second information, and establishes the correspondence between the identifier of the second terminal and the identifier of the second bearer.

Manner 2: The session management network element obtains the identifier of the second terminal from the second terminal, and establishes a correspondence between the identifier of the second terminal and a QFI of the first QoS flow.

The identifier of the second terminal may be the application layer identifier of the second terminal or the discovery parameter of the second terminal, and the second bearer may be a QoS flow.

In some embodiments, the second terminal may send third information to the session management network element. The third information may include the identifier of the second terminal and a session identifier of the second terminal. The session identifier may be the first session that identifies the second terminal. Further, the session management network element may establish the first QoS flow of the first session based on the identifier of the second terminal, to establish the correspondence between the identifier of the second terminal and the QFI of the first QoS flow. The first QOS flow is for transmitting the data of the first application for the second terminal.

The third information may further include first indication information indicating to establish the QoS flow. The session management network element may establish the first QoS flow of the first session based on the identifier of the second terminal and the first indication information.

In an example, in the foregoing manner 1 and manner 2, before the second terminal sends the second information or the third information, the second terminal may determine, based on policy information, whether the data of the first application can be locally forwarded by the access network device. The policy information may be obtained by the second terminal from a PCF network element when the second terminal registers with a network. If the second terminal determines that the data of the first application can be locally forwarded by the access network device, the second terminal sends the second information or the third information to the session management network element.

In another example, in the foregoing manner 1 and manner 2, before the second terminal sends the second information or the third information, the second terminal may obtain the third indication information. For indication content and a source of the third indication information, refer to descriptions of step S100. Further, the second terminal may send the second information or the third information to the session management network element based on the third indication information.

Manner 3: The session management network element obtains the application layer identifier of the second terminal from the PCF network element, and establishes a correspondence between the application layer identifier of the second terminal and a session identifier of the first session.

The identifier of the second terminal may be the application layer identifier of the second terminal, and the second bearer may be a session.

In some embodiments, the PCF network element may obtain the application layer identifier of the second terminal and a session management policy association identifier, and the PCF network element may send fourth information to the session management network element, where the fourth information includes the application layer identifier of the second terminal and the session management policy association identifier. Further, the session management network element stores a correspondence between the session management policy association identifier and the session identifier of the first session of the second terminal. Therefore, the session management network element can determine the first session of the second terminal based on the session management policy association identifier, to establish the correspondence between the application layer identifier of the second terminal and the session identifier of the first session.

Manner 4: The session management network element obtains the application layer identifier of the second terminal from the PCF network element, and establishes a correspondence between the application layer identifier of the second terminal and a QFI of the first QoS flow.

The identifier of the second terminal may be the application layer identifier of the second terminal, and the second bearer may be a QoS flow.

In some embodiments, the PCF network element may obtain the application layer identifier of the second terminal and a session management policy association identifier, and may send fourth information to the session management network element, where the fourth information includes the application layer identifier of the second terminal and the session management policy association identifier. Further, the session management network element stores a correspondence between the session management policy association identifier and a session identifier of the first session of the second terminal. Therefore, the session management network element can determine the first session of the second terminal based on the session management policy association identifier. The session management network element establishes the first QoS flow of the first session based on the application layer identifier of the second terminal, to establish the correspondence between the application layer identifier of the second terminal and the QFI of the first QoS flow.

It should be noted that, in the foregoing manner 3 and manner 4, a process in which the PCF network element obtains the application layer identifier of the second terminal and the session management policy association identifier may be: An AF may obtain, from the second terminal at an application layer, an IP address associated with the first session of the second terminal, and determine, based on the IP address, the PCF network element associated with the first session. The AF sends, to the PCF network element, the IP address associated with the first session and the application layer identifier of the second terminal. The PCF network element stores a correspondence among an IP address, a session identifier, and a session management policy association identifier. Therefore, when receiving the IP address associated with the first session, the PCF network element can determine the corresponding session identifier and session management policy association identifier of the first session. The PCF network element may send the session management policy association identifier and the application layer identifier of the second terminal to the session management network element via the fourth information.

Manner 5: The session management network element obtains the discovery parameter of the second terminal from the DDNMF network element, and establishes a correspondence between the discovery parameter of the second terminal and a session identifier of the first session.

The identifier of the second terminal may be the discovery parameter of the second terminal, and the second bearer may be a session.

In some embodiments, the DDNMF network element sends fifth information to the session management network element, where the fifth information includes the discovery parameter of the second terminal and an SUPI of the second terminal. Correspondingly, the session management network element determines, based on the SUPI of the second terminal, the first session for transmitting the data of the first application for the second terminal, to establish the correspondence between the discovery parameter of the second terminal and the session identifier of the first session.

Manner 6: The session management network element obtains the discovery parameter of the second terminal from the DDNMF network element, and establishes a correspondence between the discovery parameter of the second terminal and a QFI of the first QoS flow.

The identifier of the second terminal may be the discovery parameter of the second terminal, and the second bearer may be a QoS flow.

In some embodiments, the DDNMF network element sends fifth information to the session management network element, where the fifth information includes the discovery parameter of the second terminal and an SUPI of the second terminal. Correspondingly, the session management network element determines, based on the SUPI of the second terminal, the first session for transmitting the data of the first application for the second terminal. The session management network element establishes the first QoS flow of the first session based on the discovery parameter of the second terminal, to establish the correspondence between the discovery parameter of the second terminal and the QFI of the first QoS flow.

It should be noted that, in the foregoing manner 5 and the manner 6, a process in which the session management network element determines the first session of the second terminal based on the SUPI of the second terminal may include: The session management network element determines, based on the SUPI of the second terminal, a session that is established for the second terminal and that is used for D2D communication, where the session used for D2D communication may be a session established by the session management network element based on a DNN indicating a D2D communication service.

If there is only one session that is established for the second terminal and that is used for D2D communication, the session is used as the first session. Optionally, if there are a plurality of sessions that are established for the second terminal and that are used for D2D communication, one session may be selected from the plurality of sessions as the first session. Alternatively, in addition to the discovery parameter of the second terminal and the SUPI of the second terminal, the fifth information sent by the DDNMF network element to the session management network element may further include an identifier of the first application, and the session management network element may further receive sixth information from the second terminal, where the sixth information includes the identifier of the first application and the identifier of the first session. The session management network element may determine, based on the identifier of the first application in the fifth information, the SUPI of the second terminal, and the sixth information, the first session for transmitting the data of the first application for the second terminal.

Manner 7: The session management network element obtains the discovery parameter of the second terminal from the DDNMF network element, and establishes a correspondence between the discovery parameter of the second terminal and the identifier of the second bearer.

The identifier of the second terminal may be the discovery parameter of the second terminal, and the second bearer may be a QoS flow or a session.

In some embodiments, the DDNMF network element may send fifth information to the session management network element, where the fifth information includes the discovery parameter of the second terminal, an SUPI of the second terminal, and an identifier of the first application. The session management network element may receive sixth information from the second terminal, where the sixth information includes the identifier of the first application and the identifier of the second bearer. In other words, the second terminal indicates to the session management network element that the second bearer is for transmitting the data of the first application for the second terminal. The session management network element may determine the corresponding second bearer based on the SUPI of the second terminal in the fifth information, the identifier of the first application, and the sixth information, and establish the correspondence between the discovery parameter of the second terminal and the identifier of the second bearer.

In the second optional implementation, after receiving the first message, the session management network element obtains a corresponding parameter from a related network element based on the identifier of the second terminal in the first message, where the parameter is for determining the identifier of the second bearer, and the session management network element obtains the identifier of the second bearer based on the parameter.

It should be noted that the second optional implementation may be used in a scenario in which the session management network element does not prestore a correspondence between the identifier of the second terminal and the identifier of the second bearer.

Optionally, if the identifier of the second terminal is the discovery parameter of the second terminal, the related network element may be the DDNMF network element, and the parameter may be an SUPI of the second terminal. In some embodiments, the session management network element sends a second message to the DDNMF network element, where the second message includes the discovery parameter of the second terminal, and the second message requests the SUPI that is of the second terminal and that corresponds to the discovery parameter of the second terminal. Correspondingly, the DDNMF network element sends the SUPI of the second terminal to the session management network element. The session management network element may determine the identifier of the second bearer based on the SUPI of the second terminal. In some embodiments, if the second bearer is a session, the session management network element may determine the first session of the second terminal based on the SUPI of the second terminal. For a specific determining method, refer to specific descriptions of "determining the first session of the second terminal based on the SUPI of the second terminal" in the foregoing embodiment. Details are not described herein again. If the second bearer is a QoS flow, after determining the first session of the second terminal based on the SUPI of the second terminal, the session management network element may establish the first QoS flow of the first session based on the discovery parameter of the second terminal, to determine a QFI of the first QoS flow as the identifier of the second bearer.

Optionally, if the identifier of the second terminal is the application layer identifier of the second terminal, the related network element may be the PCF network element, and the parameter may be a session management policy association identifier. For example, the session management network element may request, from the PCF network element, the session management policy association identifier corresponding to the application layer identifier of the second terminal. The PCF network element may obtain, from the AF network element, an IP address that is of the second terminal and that corresponds to the application layer identifier of the second terminal. The PCF network element may determine the first session of the second terminal and the corresponding session management policy association identifier based on the IP address of the second terminal. The PCF network element sends the session management policy association identifier to the session management network element, and the session management network element may determine the identifier of the second bearer based on the session management policy association identifier. In some embodiments, if the second bearer is a session, the session management network element may determine a session identifier of the first session of the second terminal based on the session management policy association identifier. If the second bearer is a QoS flow, after determining the first session of the second terminal based on the session management policy association identifier, the session management network element establishes the first QoS flow of the first session based on the application layer identifier of the second terminal, to determine the QFI of the first QoS flow as the identifier of the second bearer.

In this embodiment of this application, the session management network element may determine the identifier of the second bearer in the first optional implementation or the second optional implementation. In this embodiment of this application, the session management network element may determine the identifier of the first bearer in the following third optional implementation or the following fourth optional implementation.

It should be noted that in this embodiment of this application, a manner in which the session management network element determines the identifier of the first bearer and a manner in which the session management network element determines the identifier of the second bearer are independent of each other.

The following uses the third optional implementation and the fourth optional implementation as examples to describe a process in which the session management network element determines the identifier of the first bearer.

In the third optional implementation, the first bearer for transmitting the data of the first application for the first terminal is pre-established, and the session management network element determines the identifier of the first bearer based on the first message.

The first bearer may be a second session for transmitting the data of the first application for the first terminal, or the first bearer may be a second QoS flow for transmitting the data of the first application for the first terminal.

Optionally, the first message includes an identifier of the first bearer. For example, if the first bearer is the second session, the first message may include a session identifier of the second session of the first terminal.

It should be noted that if the first bearer is the second QoS flow of the second session, the first message may include the session identifier of the second session of the first terminal and a QFI of the second QoS flow.

Optionally, the first bearer is a QoS flow, and the session management network element pre-establishes, for the first terminal in the second session of the first terminal based on seventh information, the second QoS flow for transmitting the data of the first application. The session management network element may store the seventh information and a correspondence between the session identifier of the second session of the first terminal and the QFI of the second QoS flow. The seventh information may be the identifier of the first application and/or the application layer identifier of the first terminal.

For example, the session management network element receives the first message, where the first message may include the seventh information and a session identifier of the first terminal, and the session identifier of the first terminal identifies the second session of the first terminal. The session management network element may determine, based on the stored seventh information and the stored correspondence between the session identifier of the second session and the QFI of the second QoS flow, that the identifier of the first bearer is the QFI of the second QoS flow of the second session.

In the fourth optional implementation, the session management network element establishes, based on the first message, the first bearer for transmitting the data of the first application for the first terminal, where the first bearer is a QoS flow, and determines an identifier of the QoS flow as the identifier of the first bearer.

For example, the first message includes seventh information and a session identifier of the first terminal, the seventh information includes the identifier of the first application and/or the application layer identifier of the first terminal, the session identifier of the first terminal identifies a second session of the first terminal, and the session management network element establishes a second QoS flow of the second session based on the seventh information, to determine a QFI of the second QoS flow as the identifier of the first bearer.

For another example, the first message includes the discovery parameter of the second terminal and a session identifier of the first terminal, the session identifier of the first terminal identifies a second session of the first terminal, and the session management network element establishes a second QoS flow of the second session based on the discovery parameter of the second terminal, to determine a QFI of the second QoS flow as the identifier of the first bearer.

In the fourth optional implementation, the first message may further include second indication information, the second indication information indicates to establish the QoS flow, and the session management network element may establish the second QoS flow of the second session based on the second indication information.

In the first optional implementation to the fourth optional implementation, after the session management network element obtains the identifier of the first bearer and the identifier of the second bearer, the session management network element sends the first information to the access network device, where the first information includes the identifier of the first bearer and the identifier of the second bearer.

For example, the session management network element may send the first information to the access network device through the access and mobility management network element. For example, the session management network element may send the first information to the access and mobility management network element via an N1N2 transfer message (for example, an N1N2 message transfer message). Then, the access and mobility management network element sends the first information to the access network device.

Optionally, before sending the first information to the access network device, the access and mobility management network element may further determine whether the first bearer and the second bearer correspond to a same access network device. If the first bearer and the second bearer correspond to the same access network device, the first information is sent to the access network device. Alternatively, if the first bearer and the second bearer correspond to different access network devices, refer to descriptions in FIG. 16 in a subsequent embodiment. Details are not described herein again.

S104: The access network device directly forwards the data of the first application between the first terminal and the second terminal based on the identifier of the first bearer and the identifier of the second bearer.

In an example, the access network device may establish a correspondence between the first bearer and the second bearer based on the identifier of the first bearer and the identifier of the second bearer, and locally forward the data of the first application based on the correspondence, that is, directly forward the data of the first application between the first terminal and the second terminal based on the correspondence. The correspondence may be a correspondence between the identifier of the first bearer and the identifier of the second bearer. This is not limited.

That the access network device directly forwards the data of the first application between the first terminal and the second terminal may mean that the access network device receives the data of the first application from the first terminal on the first bearer, and directly sends the received data of the first application to the second terminal on the second bearer corresponding to the first bearer; and/or the access network device receives the data of the first application from the second terminal on the second bearer, and directly sends the received data of the first application to the first terminal on the first bearer corresponding to the second bearer.

It should be noted that the access network device may learn, based on the correspondence, that the first bearer corresponds to the second bearer.

Optionally, it is assumed that the first bearer is the second session of the first terminal, and the second bearer is the first session of the second terminal. The access network device may directly forward, to the second terminal on the radio bearer associated with the first session of the second terminal, the data that is of the first application and that is received on the radio bearer associated with the second session of the first terminal. Alternatively, the access network device may directly forward, to the first terminal on the radio bearer associated with the second session of the first terminal, the data that is of the first application and that is received on the radio bearer associated with the first session of the second terminal.

Optionally, it is assumed that the first bearer is the second QoS flow of the second session of the first terminal, and the second bearer is the first QoS flow of the first session of the second terminal. In this case, the access network device may directly forward, to the second terminal through the first QoS flow of the first session of the second terminal, the data that is of the first application and that is received through the second QoS flow of the second session of the first terminal. Alternatively, the access network device may directly forward, to the first terminal through the second QoS flow associated with the second session of the first terminal, the data that is of the first application and that is received through the first QoS flow of the first session of the second terminal.

For example, the session management network element may send, to the first terminal, the IP address associated with the first session of the second terminal, so that the first terminal generates or updates a QoS flow rule. For example, the first terminal maps, to the second QoS flow, data whose destination address is the IP address associated with the first session of the second terminal. Likewise, the session management network element may also send, to the second terminal, an IP address associated with the second session of the first terminal, so that the second terminal generates or updates the QoS flow rule. For example, the second terminal maps, to the first QoS flow, data whose destination address is the IP address associated with the second session of the first terminal.

It should be noted that, in steps S100 to S104 in the foregoing embodiment, to avoid that an identifier of a terminal (an identifier of the first terminal or the identifier of the second terminal) is repeated in different applications, an identifier of the terminal in the first application may be uniquely determined based on the identifier of the first application and the identifier of the terminal (where the identifier of the terminal may be an application layer identifier or a discovery parameter). For example, when obtaining the identifier of the second bearer based on the identifier of the second terminal, the session management network element may obtain the identifier of the second bearer based on the identifier of the second terminal and the identifier of the first application. In addition, when obtaining the correspondence between the identifier of the second terminal and the identifier of the second bearer, the session management network element also obtains a correspondence between the identifier of the first application/the identifier of the second terminal and the identifier of the second bearer.

It may be understood that, if one session carries only data of a specific application, in other words, the application is bound to the session, an identifier of the terminal in an application may not be uniquely determined based on an identifier of the application. For example, the application corresponds to one independent slice, in other words, only the application can use the slice. If the session supports the slice, the session can carry only data of the application corresponding to the slice.

With reference to FIG. 6 to FIG. 15, the method shown in FIG. 5 is described in more detail. For ease of understanding, in FIG. 6 to FIG. 15, an example in which a terminal device is UE (where for example, a first terminal is UE 1, and a second terminal is UE 2), an access and mobility management network element is an AMF, an access network device is a RAN, a session management network element is an SMF, an application layer identifier is an APP user ID (where for example, an application layer identifier of the first terminal is an APP user 1 ID, and an application layer identifier of the second terminal is an APP user 2 ID), and an identifier of a first application is indicated by using an APP ID is used for description.

In the embodiments shown in FIG. 6 to FIG. 13, the SMF prestores a correspondence between an identifier of the UE 2 and an identifier of a second bearer. Optionally, the embodiments shown in FIG. 6 to FIG. 13 may be example descriptions of the first optional implementation in the embodiment in FIG. 5. In the embodiments shown in FIG. 14 and FIG. 15, the SMF does not prestore a correspondence between an identifier of the UE 2 and an identifier of a second bearer. After receiving a first message, the SMF obtains an SUPI of the second terminal from a DDNMF, to determine the identifier of the second bearer. Optionally, the embodiments shown in FIG. 14 and FIG. 15 may be example descriptions of the second optional implementation in the embodiment in FIG. 5.

For ease of description, in subsequent embodiments, a PDU session 1 ID is used as a session identifier of a first session, and a PDU session 2 ID is used as a session identifier of a second session. A QFI 1 is used as a QFI of a first QoS flow, and a QFI 2 is used as a QFI of a second QoS flow. It may be understood that content of the embodiments in FIG. 6 to FIG. 15 may be mutually referenced. It should be noted that in the subsequent embodiments, (APP ID, APP User ID) may exist in combination, or only (APP User ID) may be included.

Figure 6:
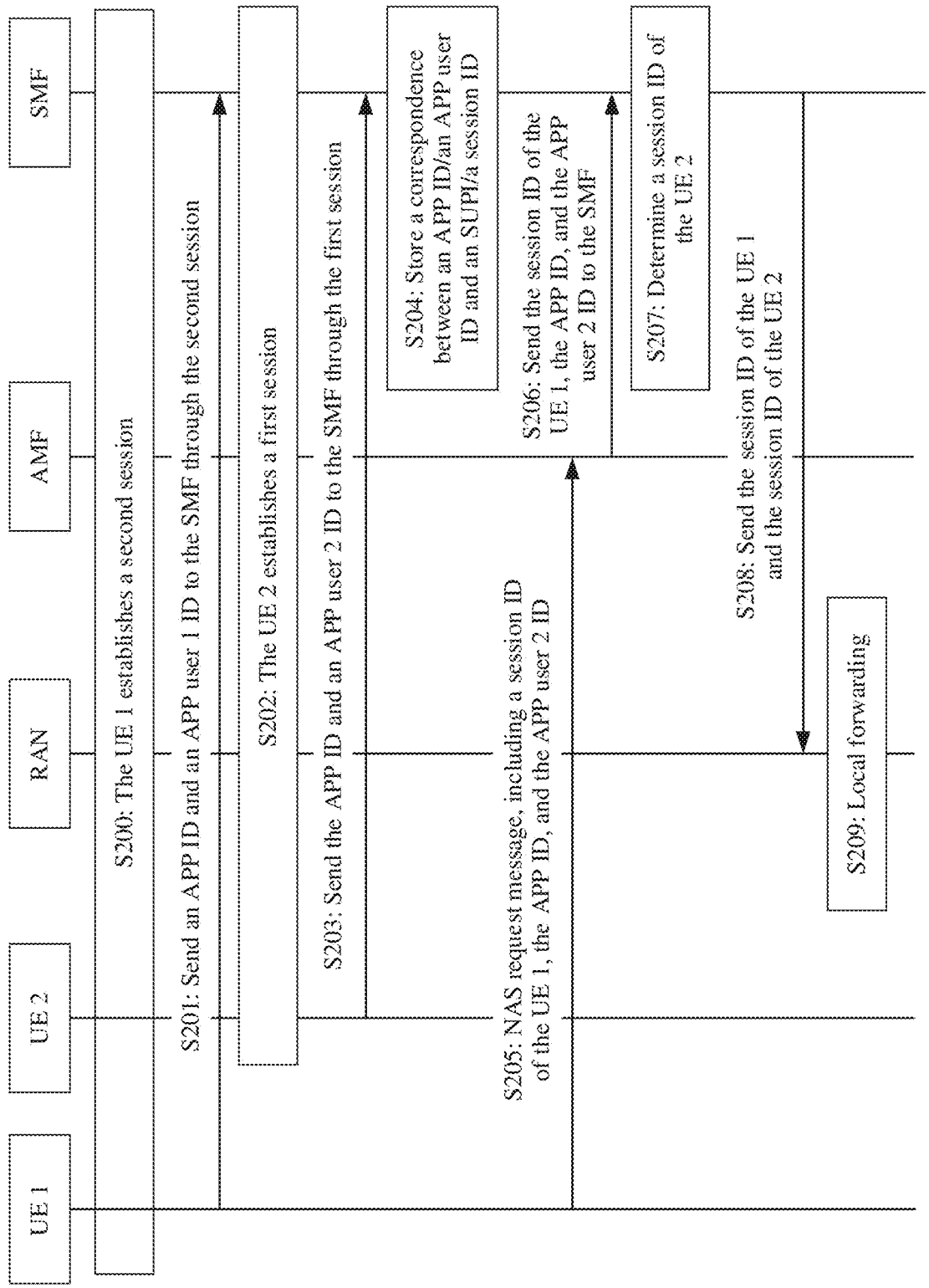
FIG. 6 to FIG. 16 each are a schematic flowchart of a specific example of a data communication method according to this application.
Figure 7:
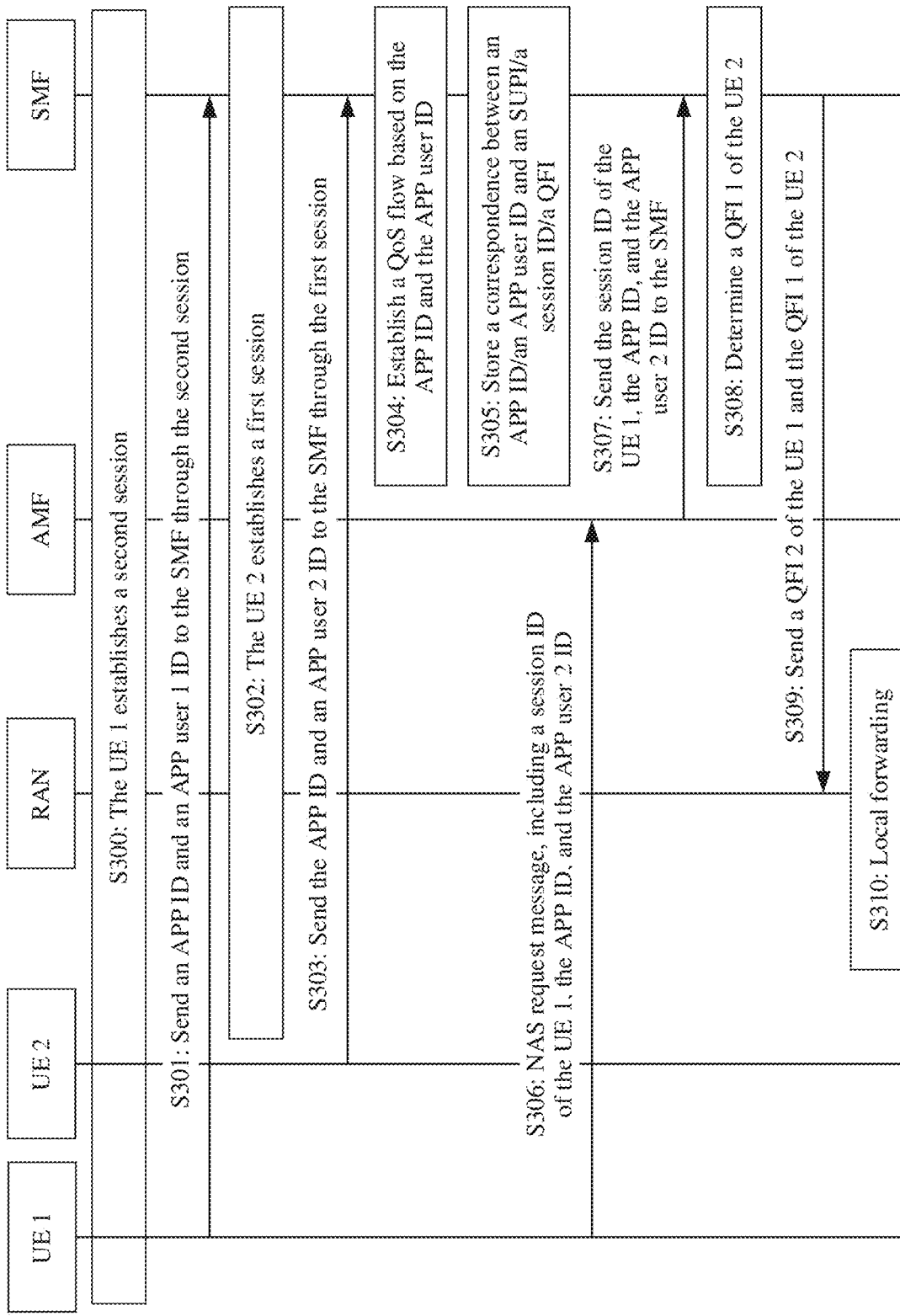

Refer to FIG. 6 and FIG. 7. An identifier of UE 2 may be an application layer identifier of the UE 2 in a first application, and the UE 2 sends the application layer identifier of the UE 2 to an SMF, so that the SMF establishes a correspondence between the application layer identifier of the UE 2 and an identifier of a second bearer. In the embodiment shown in FIG. 6, the second bearer is a first session. In the embodiment shown in FIG. 7, the second bearer is a first QoS flow. The following separately provides specific descriptions.

As shown in FIG. 6, this embodiment includes but is not limited to the following steps.

S200: UE 1 establishes a second session.

The UE 1 establishes the second session for a D2D communication service. Optionally, the UE 1 sends a session establishment request message to an AMF, where the session establishment request message may include a data network name (DNN) identifier, and the DNN identifier indicates the D2D communication service. The AMF selects, based on the DNN identifier, an SMF serving D2D communication. Optionally, in a network, the D2D communication service and a related configuration may be managed by a same SMF. Optionally, the session establishment request message further includes an SUPI of the UE 1 and a session identifier (PDU session 2 ID) of the second session.

S201: After the UE 1 establishes the second session, the UE 1 sends an identifier (APP ID) of a first application and an application layer identifier (APP User 1 ID) of the UE 1 to the SMF.

Optionally, the UE 1 may send the identifier (APP ID) of the first application and the application layer identifier (APP User 1 ID) of the UE 1 to the SMF via a session modification message (PDU Session Modification Request). The session modification message may include the session identifier (PDU session 2 ID) of the second session of the UE 1.

Correspondingly, the SMF stores a correspondence between the application layer identifier (APP User 1 ID) of the UE 1 and the session identifier (PDU session 2 ID) of the second session of the UE 1. For example, the SMF stores a correspondence between (APP ID, APP User 1 ID) and (SUPI of the UE 1, PDU session 2 ID).

It may be understood that the UE 1 may alternatively send the identifier (APP ID) of the first application and the application layer identifier (APP User 1 ID) of the UE 1 to the SMF via the session establishment request message in step S200.

Optionally, before the UE 1 sends the identifier (APP ID) of the first application and the application layer identifier (APP User 1 ID) of the UE 1 to the SMF, the UE 1 may determine, based on policy information of the UE 1, whether data of the first application can be locally forwarded by a RAN. If the data of the first application can be locally forwarded by the RAN, the UE 1 sends the identifier (APP ID) of the first application and the application layer identifier (APP User 1 ID) of the UE 1 to the SMF. The policy information of the UE 1 may be policy information sent by a PCF network element to the UE 1 during registration of the UE 1. Optionally, the policy information includes an identifier of at least one application that can be locally forwarded by the RAN. The UE 1 may determine whether the identifier (APP ID) of the first application matches the identifier of the at least one application, to determine whether the data of the first application can be locally forwarded by the RAN.

It should be noted that step S200 and step S201 are optional steps.

S202: UE 2 establishes a first session.

The UE 2 establishes the first session for the D2D communication service. For a process in which the UE 2 establishes the first session, refer to the step in which the UE 1 establishes the second session in step S200. Details are not described herein again.

S203: After the UE 2 establishes the first session, the UE 2 sends the identifier (APP ID) of the first application and an application layer identifier (APP User 2 ID) of the UE 2 to the SMF.

Optionally, the UE 2 may send the identifier (APP ID) of the first application and the application layer identifier (APP User 2 ID) of the UE 2 to the SMF via a session modification message (PDU Session Modification Request). The session modification message may include a session identifier (PDU session 1 ID) of the first session of the UE 2. Correspondingly, the SMF stores a correspondence between the application layer identifier (APP User 2 ID) of the UE 2 and the session identifier (PDU session 1 ID) of the first session of the UE 2. For example, the SMF stores a correspondence between (APP ID, APP User 2 ID) and (SUPI of the UE 2, PDU session 1 ID).

It may be understood that the UE 2 may alternatively send the identifier (APP ID) of the first application and the application layer identifier (APP User 2 ID) of the UE 2 to the SMF via the session establishment request message in step S202.

Optionally, before the UE 2 sends the identifier (APP ID) of the first application and the application layer identifier (APP User 2 ID) of the UE 2 to the SMF, the UE 2 may determine whether the data of the first application can be locally forwarded by the RAN. For details, refer to descriptions of step S201. Details are not described herein again.

S204: The SMF may store a correspondence between the identifier of the first application/the application layer identifier of the UE 2 and the session identifier of the first session of the UE 2. In some embodiments, the SMF stores the correspondence between (APP ID, APP User 2 ID) and (SUPI of the UE 2, PDU session 1 ID).

Optionally, the SMF may further store a correspondence between the identifier of the first application/the application layer identifier of the UE 1 and the session identifier of the second session of the UE 1. In some embodiments, the SMF stores the correspondence between (APP ID, APP User 1 ID) and (SUPI of the UE 1, PDU session 2 ID).

S205: The UE 1 requests to communicate with the UE 2 from a core network. In the first application corresponding to the APP ID, an application layer user corresponding to the application layer identifier (APP User 1 ID) of the UE 1 requests to communicate with an application layer user corresponding to the application layer identifier (APP User 2 ID) of the UE 2.

For example, the UE 1 sends a request message to the AMF, where the request message includes the identifier (APP ID) of the first application and the application layer identifier (APP User 2 ID) of the UE 2. Optionally, the request message may further include the session identifier (PDU session 2 ID) of the second session of the UE 1.

In some embodiments, the request message may be a NAS request message. For example, the NAS request message may be a session modification request message or a newly defined message (for example, an association establishment request message).

S206: The AMF sends a first message to the SMF.

The first message may include the identifier (APP ID) of the first application and the application layer identifier (APP User 2 ID) of the UE 2. Optionally, the first message may further include the session identifier (PDU session 2 ID) of the second session of the UE 1. In some embodiments, the first message may be a create session management context request (Create SM Context Request) message or an update session management context (Update SM Context) message.

S207: The SMF determines the SUPI of the UE 2 and the corresponding session identifier (PDU session 1 ID) of the first session based on the identifier (APP ID) of the first application and the application layer identifier (APP User 2 ID) of the UE 2 that are included in the first message and the correspondence stored in step S204.

Optionally, the first message includes the session identifier (PDU session 2 ID) of the second session of the UE 1.

Optionally, if the first message does not include the session identifier (PDU session 2 ID) of the second session of the UE 1, the SMF may determine the session identifier (PDU session 2 ID) of the second session of the UE 1 based on the correspondence stored in step S204 and seventh information included in the first message. The seventh information may be the identifier (APP ID) of the first application and/or the application layer identifier (APP User 1 ID) of the UE 1.

S208: The SMF sends configuration information to the RAN through the AMF.

The configuration information may include a correspondence between the second session of the UE 1 and the first session of the UE 2. In the correspondence, the second session may be identified by using the PDU session 2 ID, and the first session may be identified by using the PDU session 1 ID.

In some embodiments, the SMF may send the configuration information to the AMF via an update session management context response (Update SM Context Response) message or a session management context status notify (SM Context Status Notify) message, and the AMF sends the configuration information to the RAN via an N2 message.

S209: The RAN performs local forwarding based on the correspondence between the second session of the UE 1 and the first session of the UE 2.

In some embodiments, the RAN receives the data of the first application from the UE 1 through the second session, and directly forwards the data to the UE 2 through the first session. Alternatively, the RAN receives the data of the first application from the UE 2 through the first session, and directly forwards the data to the UE 1 through the second session.

As shown in FIG. 7, this embodiment includes but is not limited to the following steps.

S300: UE 1 establishes a second session.

S301: After the UE 1 establishes the second session, the UE 1 sends an identifier (APP ID) of a first application and an application layer identifier (APP User 1 ID) of the UE 1 to an SMF.

It should be noted that step S300 and step S301 are optional steps.

S302: UE 2 establishes a first session.

S303: After the UE 2 establishes the first session, the UE 2 sends the identifier (APP ID) of the first application and an application layer identifier (APP User 2 ID) of the UE 2 to the SMF.

For specific descriptions of step S300 to step S303, refer to descriptions of step S200 to step S203 in the embodiment in FIG. 6. Details are not described herein again.

S304: The SMF establishes a second QoS flow of the second session based on the identifier (APP ID) of the first application and/or the application layer identifier (APP User 1 ID) of the UE 1, and establishes a first QOS flow of the first session based on the identifier (APP ID) of the first application and/or the application layer identifier (APP User 2 ID) of the UE 2.

For example, when sending the identifier (APP ID) of the first application and the application layer identifier (APP User 1 ID) of the UE 1 to the SMF, the UE 1 may request the SMF to establish the QoS flow. When sending the identifier (APP ID) of the first application and the application layer identifier (APP User 2 ID) of the UE 2 to the SMF, the UE 2 may also request the SMF to establish the QoS flow. Alternatively, the SMF actively triggers establishment of the first QoS flow or the second QoS flow. This is not limited in this embodiment of this application.

It should be noted that step S304 is an optional step.

S305: The SMF stores a correspondence between the identifier of the first application/the application layer identifier of the UE 1 and a QFI of the second QoS flow of the second session.

Optionally, the SMF further stores a correspondence between the identifier of the first application/the application layer identifier of the UE 2 and a QFI of the first QoS flow of the first session.

In the correspondences, the second QoS flow of the second session may be identified by using a PDU session 2 ID and a QFI 2, and the first QoS flow of the first session may be identified by using a PDU session 1 ID and a QFI 1.

In some embodiments, the SMF stores a correspondence between (APP ID, APP User 1 ID) and (SUPI of the UE 1, PDU session 2 ID, QFI 2), and a correspondence between (APP ID, APP User 2 ID) and (SUPI of the UE 2, PDU session 1 ID, QFI 1).

S306: The UE 1 requests to communicate with the UE 2 from a core network.

S307: An AMF sends a first message to the SMF.

For specific descriptions of step S306 and step S307, refer to descriptions of step S205 and step S206 in the embodiment in FIG. 6. Details are not described herein again.

S308: The SMF determines the QFI of the first QoS flow of the first session of the UE 2 based on the identifier (APP ID) of the first application and the application layer identifier (APP User 2 ID) of the UE 2 that are included in the first message and the correspondence stored in step S305. The QFI of the first QoS flow may be referred to as the QFI 1, and is identified by using the PDU session 1 ID and the QFI 1.

If the first QoS flow of the first session is not established in step S304, the SMF may establish the first QoS flow of the first session based on the identifier (APP ID) of the first application and/or the application layer identifier (APP User 2 ID) of the UE 2.

In an example, the first message may include the QFI of the second QOS flow of the second session of the UE 1. The QFI of the second QoS flow may be referred to as the QFI 2, and is identified by using the PDU session 2 ID and the QFI 2.

In another example, the first message may include a session identifier (PDU session 2 ID) of the second session of the UE 1. The SMF determines the QFI of the second QoS flow of the second session of the UE 1 based on the identifier (APP ID) of the first application and the session identifier (PDU session 2 ID) of the second session of the UE 1 that are included in the first message and the correspondence stored in step S305. The QFI of the second QoS flow may be referred to as the QFI 2, and is identified by using the PDU session 2 ID and the QFI 2.

In still another example, the second QoS flow of the second session is not established in step S304, and the first message may include a session identifier (PDU session 2 ID) of the second session of the UE 1 and seventh information. The SMF may establish the second QoS flow of the second session based on the seventh information, where the seventh information may be the identifier (APP ID) of the first application and/or the application layer identifier (APP User 1 ID) of the UE 1. The QFI of the second QoS flow may be referred to as the QFI 2, and is identified by using the PDU session 2 ID and the QFI 2.

S309: The SMF sends configuration information to a RAN through the AMF.

The configuration information may include a correspondence between the second QoS flow of the second session of the UE 1 and the first QoS flow of the first session of the UE 2. In the correspondence, the second QoS flow of the second session may be identified by using the PDU session 2 ID and the QFI 2, and the first QoS flow of the first session may be identified by using the PDU session 1 ID and the QFI 1.

In some embodiments, the SMF sends the configuration information to the AMF via an update session management context response (Update SM Context Response) message or a session management context status notify (SM Context Status Notify) message, and the AMF sends the configuration information to the RAN via an N2 message.

S310: The RAN performs local forwarding based on the correspondence between the second QoS flow of the second session of the UE 1 and the first QoS flow of the first session of the UE 2.

Optionally, the RAN receives data of the first application from the UE 1 through the second QoS flow of the second session, and directly forwards the data to the UE 2 through the first QoS flow of the first session. Alternatively, the RAN receives data of the first application from the UE 2 through the first QoS flow of the first session, and directly forwards the data to the UE 1 through the second QoS flow of the second session.

Figure 8:
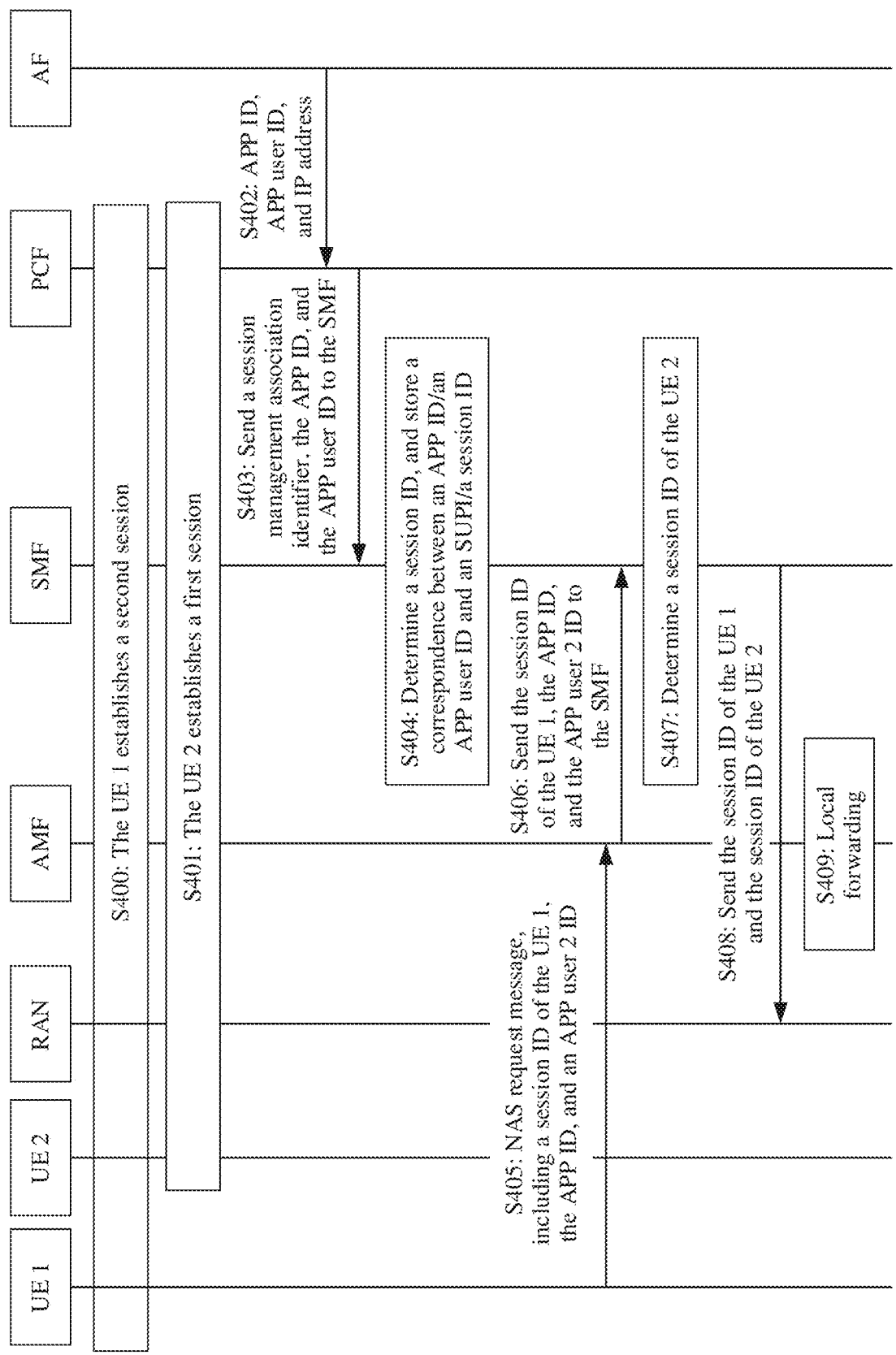
Figure 9:
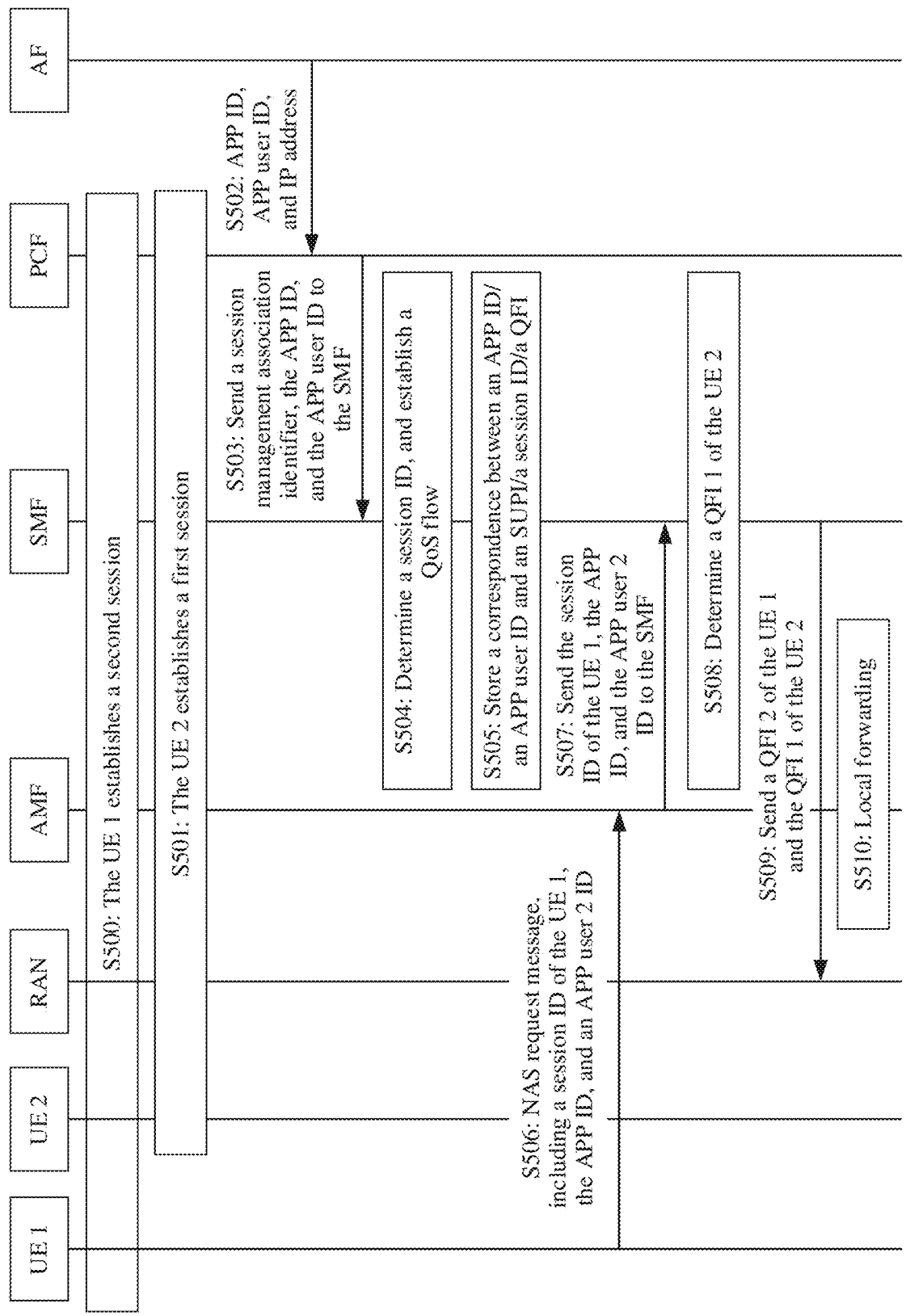

Refer to FIG. 8 and FIG. 9. An identifier of UE 2 may be an application layer identifier of the UE 2 in a first application. An AF sends the application layer identifier of the UE 2 to an SMF through a PCF, so that the SMF establishes a correspondence between the application layer identifier of the UE 2 and an identifier of a second bearer. In the embodiment shown in FIG. 8, the second bearer is a first session. In the embodiment shown in FIG. 9, the second bearer is a first QoS flow. The following separately provides specific descriptions.

As shown in FIG. 8, this embodiment includes but is not limited to the following steps.

S400: UE 1 establishes a second session.

S401: UE 2 establishes a first session.

For specific descriptions of step S400, refer to descriptions of step S200 in the embodiment in FIG. 6. For specific descriptions of step S401, refer to descriptions of step S202 in the embodiment in FIG. 6. Details are not described herein again.

S402: An AF obtains, from the UE 2 at an application layer, an IP address that is of the UE 2 and that is associated with the first session, and determines, based on the IP address, a PCF associated with the first session. The AF sends the IP address of the UE 2, an identifier of a first application (APP ID), and an application layer identifier (APP User 2 ID) of the UE 2 to the PCF.

Optionally, the AF may obtain, from the UE 1 at the application layer, an IP address that is of the UE 1 and that is associated with the second session, and determine, based on the IP address, a PCF associated with the second session. The AF sends the IP address of the UE 1, the identifier of the first application (APP ID), and an application layer identifier (APP User 1 ID) of the UE 1 to the PCF.

S403: The PCF determines a corresponding second session management policy association identifier based on the IP address of the UE 2, and sends the identifier of the first application (APP ID), the application layer identifier (APP User 2 ID) of the UE 2, and the second session management policy association identifier to an SMF.

Optionally, the PCF determines a corresponding first session management policy association identifier based on the IP address of the UE 1, and sends the identifier of the first application (APP ID), the application layer identifier (APP User 1 ID) of the UE 1, and the first session management policy association identifier to the SMF.

In some embodiments, the PCF stores a correspondence among an IP address, a session identifier, and a session management policy association identifier. Therefore, the PCF can determine a session identifier (PDU session 1 ID) of the first session of the UE 2 and the corresponding second session management policy association identifier based on the IP address that is of the UE 2 and that is obtained from the AF. The PCF may determine a session identifier (PDU session 2 ID) of the second session of the UE 1 and the corresponding first session management policy association identifier based on the IP address that is of the UE 1 and that is obtained from the AF.

S404: The SMF determines the corresponding session identifier (PDU session ID) based on the session management policy association identifier, and stores a correspondence between an application layer identifier and a session identifier.

In some embodiments, the SMF determines the session identifier (PDU session 1 ID) of the first session of the UE 2 based on the second session management policy association identifier, and stores a correspondence between the application layer identifier of the UE 2 and the session identifier of the first session, for example, stores a correspondence between (APP ID, APP User 2 ID) and (SUPI of the UE 2, PDU session 1 ID).

The SMF determines a session identifier (PDU session 2 ID) of a second session of the UE 1 based on the first session management policy association identifier, and stores a correspondence between an application layer identifier of the UE 1 and the session identifier of the second session, for example, stores a correspondence between (APP ID, APP User 1 ID) and (SUPI of the UE 1, PDU session 2 ID).

S405: The UE 1 requests to communicate with the UE 2 from a core network.

S406: An AMF sends a first message to the SMF.

S407: The SMF determines the session identifier (PDU session 1 ID) of the first session of the UE 2 based on the identifier (APP ID) of the first application and the application layer identifier (APP User 2 ID) of the UE 2 that are included in the first message and the correspondence stored in step S404.

For a manner in which the SMF obtains the session identifier of the second session of the UE 1, refer to descriptions of step S207 in the embodiment in FIG. 6. Details are not described herein again.

S408: The SMF sends configuration information to a RAN through the AMF.

The configuration information may include a correspondence between the second session of the UE 1 and the first session of the UE 2.

S409: The RAN performs local forwarding based on the correspondence between the second session of the UE 1 and the first session of the UE 2.

For specific descriptions of step S405 to step S409, refer to descriptions of step S205 to step S209 in the embodiment in FIG. 6. Details are not described herein again.

As shown in FIG. 9, this embodiment includes but is not limited to the following steps.

S500: UE 1 establishes a second session.

S501: UE 2 establishes a first session.

S502: An AF obtains, from the UE 2 at an application layer, an IP address that is of the UE 2 and that is associated with the first session, and determines, based on the IP address, a PCF associated with the first session. The AF sends the IP address of the UE 2, an identifier of a first application (APP ID), and an application layer identifier (APP User 2 ID) of the UE 2 to the PCF.

Optionally, the AF may obtain, from the UE 1 at the application layer, an IP address that is of the UE 1 and that is associated with the second session, and determine, based on the IP address, a PCF associated with the second session. The AF sends the IP address of the UE 1, the identifier of the first application (APP ID), and an application layer identifier (APP User 1 ID) of the UE 1 to the PCF.

S503: The PCF determines a corresponding second session management policy association identifier based on the IP address of the UE 2, and sends the identifier of the first application (APP ID), the application layer identifier (APP User 2 ID) of the UE 2, and the second session management policy association identifier to an SMF.

Optionally, the PCF determines a corresponding first session management policy association identifier based on the IP address of the UE 1, and sends the identifier of the first application (APP ID), the application layer identifier (APP User 1 ID) of the UE 1, and the first session management policy association identifier to the SMF.

For step S500 to step S503, refer to step S400 to step S403 in the embodiment in FIG. 8. Details are not described herein again.

S504: The SMF determines a corresponding session identifier (PDU session ID) based on a session management policy association identifier, and further establishes a QoS flow.

In some embodiments, the SMF determines a session identifier (PDU session 1 ID) of the first session of the UE 2 based on the second session management policy association identifier, and establishes a first QoS flow of the first session based on the identifier (APP ID) of the first application and/or the application layer identifier (APP User 2 ID) of the UE 2. The first QoS flow of the first session may be identified by using the PDU session 1 ID and a QFI 1.

The SMF determines a session identifier (PDU session 2 ID) of the second session of the UE 1 based on the first session management policy association identifier, and establishes a second QoS flow of the second session based on the identifier (APP ID) of the first application and/or the application layer identifier (APP User 1 ID) of the UE 1. The second QoS flow of the second session may be identified by using the PDU session 2 ID and a QFI 2.

Optionally, when sending the application layer identifier (APP User 1 ID) of the UE 1 and/or the application layer identifier (APP User 2 ID) of the UE 2 to the SMF through the PCF, the AF may request the SMF to establish the QoS flow. Alternatively, the SMF actively triggers establishment of the QoS flow. This is not limited in this embodiment of this application.

S505: The SMF stores a correspondence between the application layer identifier of the UE 2 and the QFI of the first QoS flow of the first session, for example, stores a correspondence between (APP ID, APP User 2 ID) and (SUPI of the UE 2, PDU session 1 ID, QFI 1).

Optionally, the SMF further stores a correspondence between the application layer identifier of the UE 1 and the QFI of the second QoS flow of the second session, for example, stores a correspondence between (APP ID, APP User 1 ID) and (SUPI of the UE 1, PDU session 2 ID, QFI 2).

S506: The UE 1 requests to communicate with the UE 2 from a core network.

S507: An AMF sends a first message to the SMF.

S508: The SMF determines the QFI of the first QOS flow of the first session of the UE 2 based on the identifier (APP ID) of the first application and the application layer identifier (APP User 2 ID) of the UE 2 that are in the first message and the correspondence stored in step S505.

For a manner in which the SMF obtains the QFI of the second QoS flow of the second session of the UE 1, refer to descriptions of step S308 in the embodiment in FIG. 7. Details are not described herein again.

S509: The SMF sends configuration information to a RAN through the AMF.

The configuration information may include a correspondence between the second QoS flow of the second session of the UE 1 and the first QoS flow of the first session of the UE 2.

S510: The RAN performs local forwarding based on the correspondence between the second QoS flow of the second session of the UE 1 and the first QOS flow of the first session of the UE 2.

For specific descriptions of step S505 to step S510, refer to descriptions of step S305 to step S310 in the embodiment in FIG. 7. Details are not described herein again.

Figure 10:
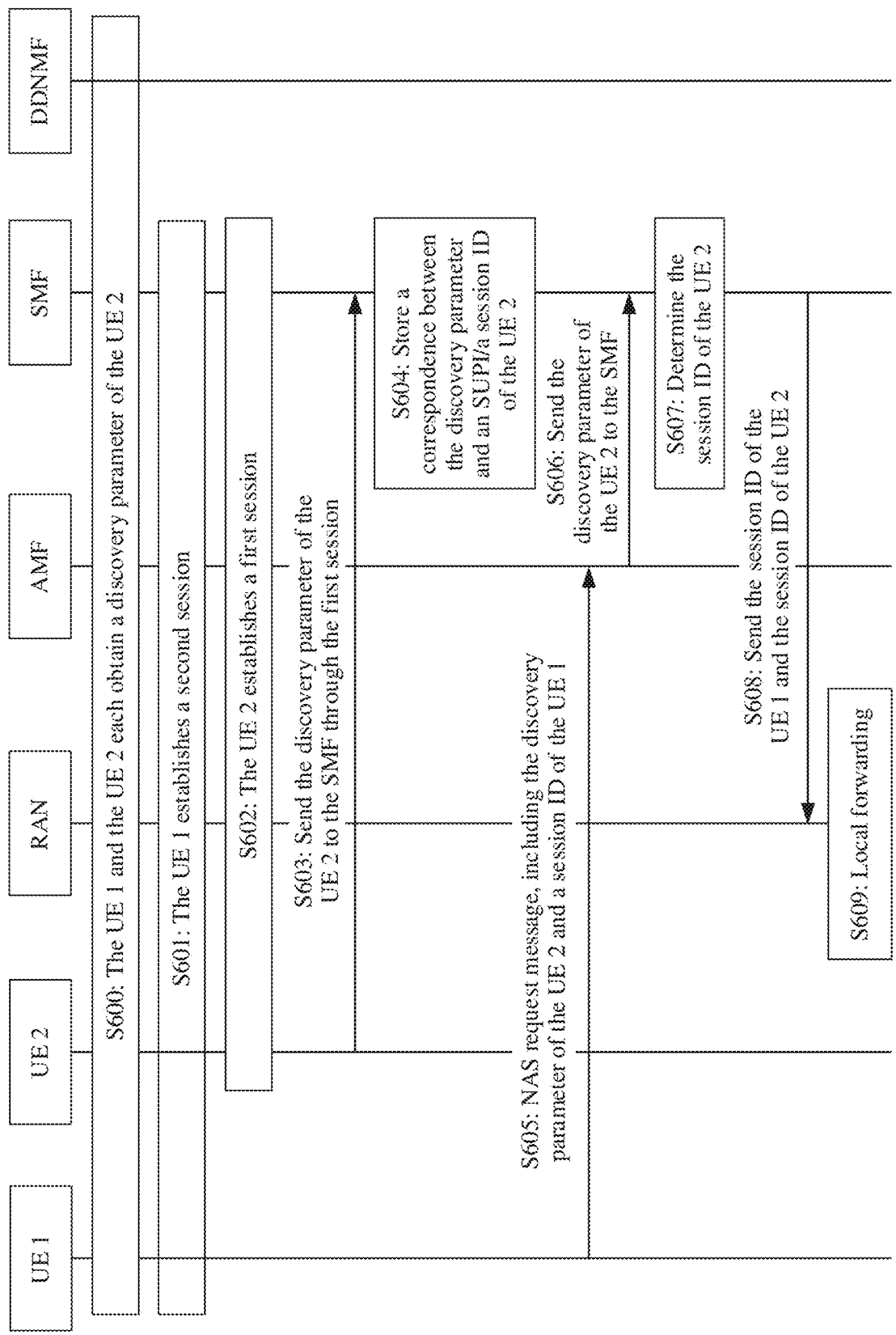
Figure 11:
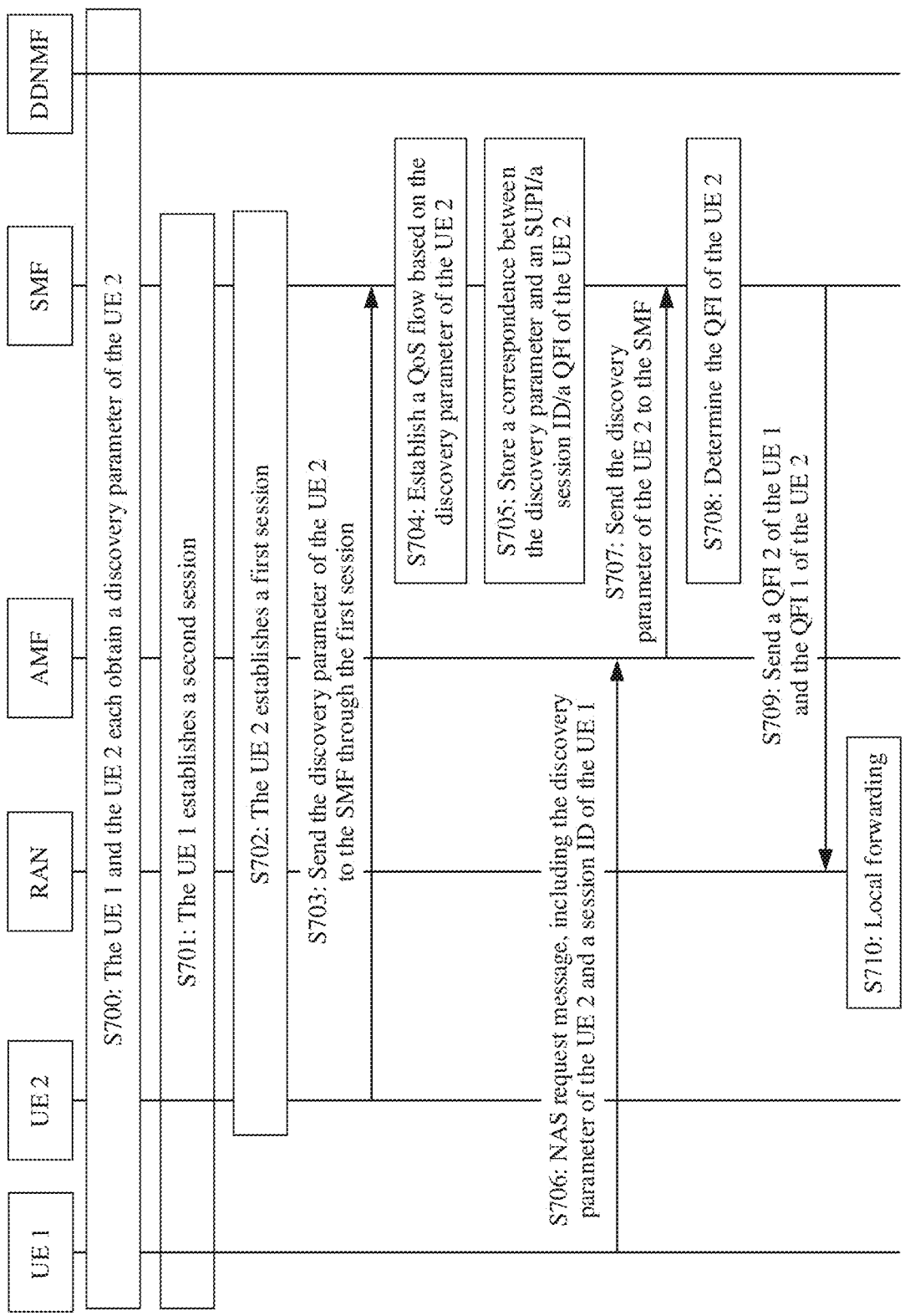

Refer to FIG. 10 and FIG. 11. An identifier of UE 2 may be a discovery parameter of the UE 2, for example, a ProSe restricted code. The UE 2 sends the discovery parameter of the UE 2 to an SMF, so that the SMF establishes a correspondence between the discovery parameter of the UE 2 and an identifier of a second bearer. In the embodiment shown in FIG. 10, the second bearer is a first session. In the embodiment shown in FIG. 11, the second bearer is a first QoS flow. The following separately provides specific descriptions.

As shown in FIG. 10, this embodiment includes but is not limited to the following steps.

S600: UE 1 and UE 2 each obtain a ProSe restricted code of the UE 2.

In some embodiments, the UE 2 may obtain the ProSe restricted code of the UE 2 from a DDNMF. For a step in which the UE 2 obtains the ProSe restricted code of the UE 2, refer to the step in which the discoveree UE obtains the discovery parameter in FIG. 3. Details are not described herein again.

The UE 1 may obtain the ProSe restricted code of the UE 2 from the DDNMF. For a step in which the UE 1 obtains the ProSe restricted code of the UE 2, refer to the step in which the discoverer UE obtains the discovery parameter in FIG. 4. Details are not described herein again.

In an example, when obtaining the ProSe restricted code of the UE 2 from the DDNMF, the UE 2 may send third indication information to the DDNMF. For indication content of the third indication information, refer to the descriptions in the foregoing embodiments. For example, if the UE 2 expects to perform D2D communication through local forwarding of a RAN, the UE 2 sends the third indication information; otherwise, the UE 2 does not send the third indication information.

In another example, when allocating the ProSe restricted code to the UE 2, the DDNMF may send the third indication information to the UE 2. For example, the DDNMF obtains subscription information of the UE 2 from a UDR. If the subscription information of the UE 2 indicates that the UE 2 can perform D2D communication through local forwarding of the RAN, the DDNMF sends the third indication information to the UE 2; otherwise, the DDNMF does not send the third indication information.

Further, optionally, when obtaining the ProSe restricted code of the UE 2 from the DDNMF, the UE 1 may also obtain the third indication information, so that the UE 1 can discover the UE 2 through a core network based on the third indication information.

S601: The UE 1 establishes a second session.

S602: The UE 2 establishes a first session.

For specific descriptions of step S601, refer to descriptions of step S200 in the embodiment in FIG. 6. For specific descriptions of step S602, refer to descriptions of step S202 in the embodiment in FIG. 6. Details are not described herein again.

S603: The UE 2 sends the ProSe restricted code of the UE 2 to an SMF.

Optionally, the UE 2 sends the ProSe restricted code of the UE 2 to the SMF based on the third indication information.

Optionally, the UE 2 may send the ProSe restricted code of the UE 2 to the SMF via a session modification message (PDU Session Modification Request), where the session modification message may include a session identifier (PDU session 1 ID) of the first session. Correspondingly, the SMF stores a correspondence between the ProSe restricted code of the UE 2 and the session identifier (PDU session 1 ID) of the first session of the UE 2. For example, the SMF stores a correspondence between (ProSe Restricted Code) and (SUPI of the UE 2, PDU session 1 ID).

Optionally, before the UE 2 sends the ProSe restricted code of the UE 2 to the SMF, the UE 2 may determine whether data of a first application corresponding to the ProSe restricted code can be locally forwarded by the RAN. For a specific determining method, refer to descriptions of the step S201.

It should be noted that step S603 may be an optional step. For example, the UE 2 may alternatively send the ProSe restricted code of the UE 2 to an SMF via the session establishment request message in step S602, where the session establishment request message may include the session identifier (PDU session 1 ID) of the first session.

S604: The SMF stores the correspondence between the ProSe restricted code and the session identifier (PDU session 1 ID) of the first session of the UE 2.

For example, the SMF stores the correspondence between (ProSe Restricted Code) and (SUPI of the UE 2, PDU session 1 ID).

S605: The UE 1 requests to communicate with the UE 2 from the core network.

For example, the UE 1 sends a request message to an AMF, where the request message includes the ProSe restricted code of the UE 2. Optionally, the request message may further include a session identifier (PDU session 2 ID) of the second session of the UE 1.

Optionally, the UE 1 may perform step S605 after the UE 1 broadcasts the ProSe restricted code of the UE 2 through a PC5 interface but does not discover the UE 2.

Optionally, alternatively, the UE 1 may request, from the core network based on the third indication information obtained from the DDNMF, to communicate with the UE 2. For example, when obtaining the ProSe restricted code of the UE 2, the UE 1 obtains the third indication information, and requests to communicate with the UE 2 from the core network. For specific indication content of the third indication information, refer to the descriptions in the foregoing embodiments. Details are not described herein again.

S606: The AMF sends a first message to the SMF.

The first message may include the ProSe restricted code of the UE 2. Optionally, the first message may further include the session identifier (PDU session 2 ID) of the second session of the UE 1.

S607: The SMF determines the session identifier (PDU session 1 ID) of the first session of the UE 2 based on the ProSe restricted code of the UE 2 in the first message and the correspondence stored in step S604.

Optionally, the first message may include the session identifier (PDU session 2 ID) of the second session of the UE 1.

S608: The SMF sends configuration information to the RAN through the AMF.

The configuration information may include a correspondence between the second session of the UE 1 and the first session of the UE 2. In the correspondence, the second session may be identified by using the PDU session 2 ID, and the first session may be identified by using the PDU session 1 ID.

S609: The RAN performs local forwarding based on the correspondence between the second session of the UE 1 and the first session of the UE 2.

For specific descriptions of step S608 and step S609, refer to descriptions of step S208 and step S209 in the embodiment in FIG. 6. Details are not described herein again.

As shown in FIG. 11, this embodiment includes but is not limited to the following steps.

S700: UE 1 and UE 2 each obtain a ProSe restricted code of the UE 2.

S701: The UE 1 establishes a second session.

S702: The UE 2 establishes a first session.

S703: The UE 2 sends the ProSe restricted code of the UE 2 to an SMF.

For specific descriptions of step S700 to step S703, refer to descriptions of step S600 to step S603 in the embodiment in FIG. 10. Details are not described herein again.

It should be noted that step S703 may be an optional step. For example, the UE 2 may alternatively send the ProSe restricted code of the UE 2 to an SMF via the session establishment request message in step S702, where the session establishment request message may include a session identifier (PDU session 1 ID) of the first session.

S704: The SMF establishes a first QOS flow of the first session based on the ProSe restricted code of the UE 2, where the first QoS flow of the first session may be identified by using the PDU session 1 ID and a QFI 1.

Optionally, when sending the ProSe restricted code to the SMF, the UE 2 may request the SMF to establish the QoS flow, or the SMF actively triggers establishment of the QoS flow. This is not limited in this embodiment of this application.

S705: The SMF stores a correspondence between the ProSe restricted code of the UE 2 and the QFI of the first QoS flow of the first session, for example, stores a correspondence between (ProSe Restricted Code) and (SUPI of the UE 2, PDU session 1 ID, QFI 1).

S706: The UE 1 requests to communicate with the UE 2 from a core network.

S707: An AMF sends a first message to the SMF, where the first message may include the ProSe restricted code of the UE 2, and optionally, the first message may further include a session identifier (PDU session 2 ID) of the second session of the UE 1.

For specific descriptions of step S706 and step S707, refer to step S605 and step S606 in the embodiment in FIG. 10. Details are not described herein again.

S708: The SMF determines the QFI of the first QoS flow of the first session of the UE 2 based on the ProSe restricted code of the UE 2 in the first message and the correspondence stored in step S705.

In an example, the first message may further include a QFI of a second QoS flow of the second session of the UE 1, and the second QoS flow of the second session may be identified by using a PDU session 2 ID and a QFI 2.

In another example, the first message may further include a session identifier (PDU session 2 ID) of the second session of the UE 1 and seventh information. The seventh information is an identifier (APP ID) of a first application and/or an application layer identifier (APP User 1 ID) of the UE 1. The SMF may establish the second QoS flow of the second session based on the seventh information. The second QoS flow of the second session may be identified by using the PDU session 2 ID and a QFI 2.

S709: The SMF sends configuration information to a RAN through the AMF.

The configuration information may include a correspondence between the second QoS flow of the second session of the UE 1 and the first QoS flow of the first session of the UE 2.

S710: The RAN performs local forwarding based on the correspondence between the second QoS flow of the second session of the UE 1 and the first QOS flow of the first session of the UE 2.

For specific descriptions of step S709 and step S710, refer to descriptions of step S309 and step S310 in the embodiment in FIG. 7. Details are not described herein again.

Figure 12:
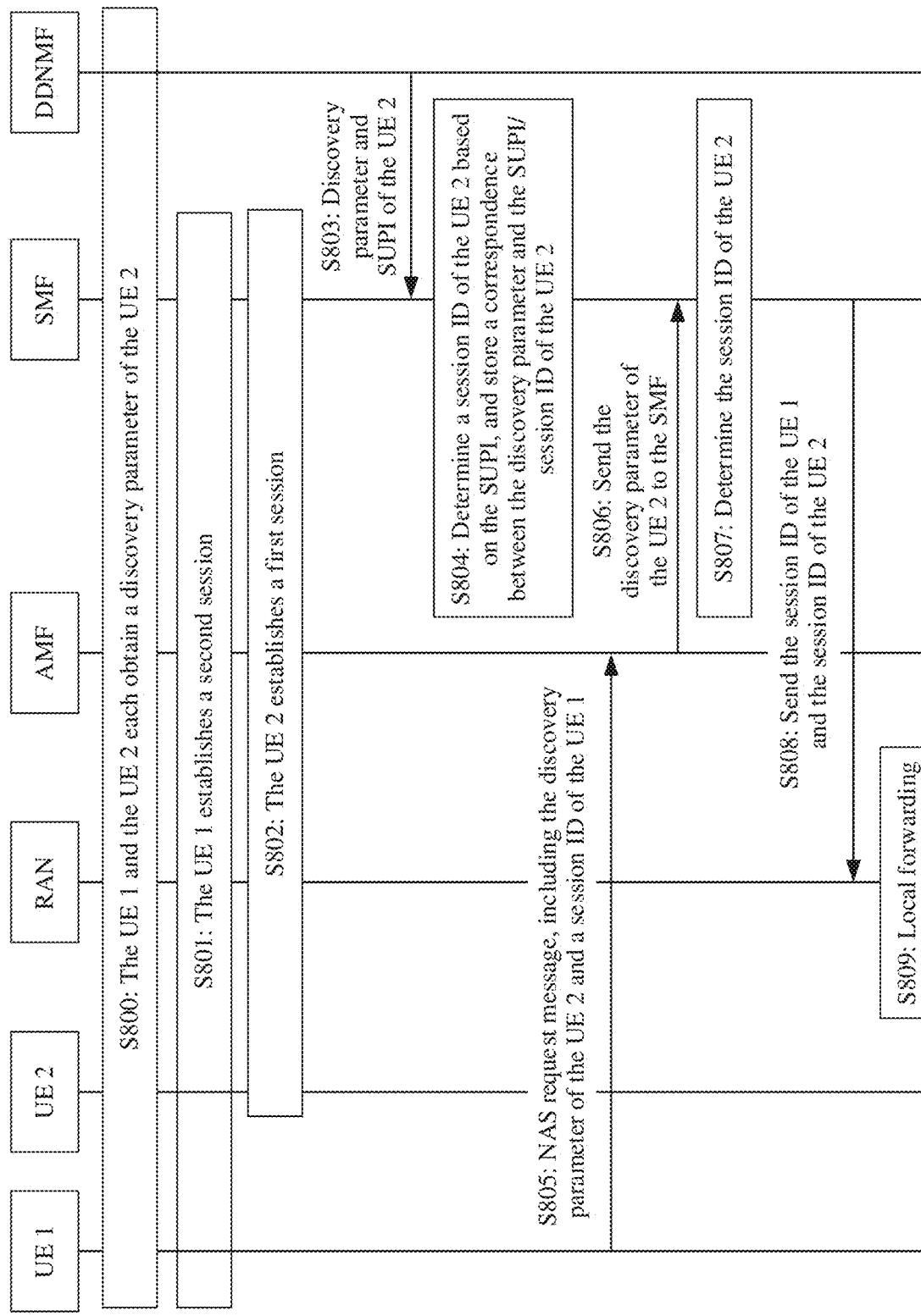
Figure 13:
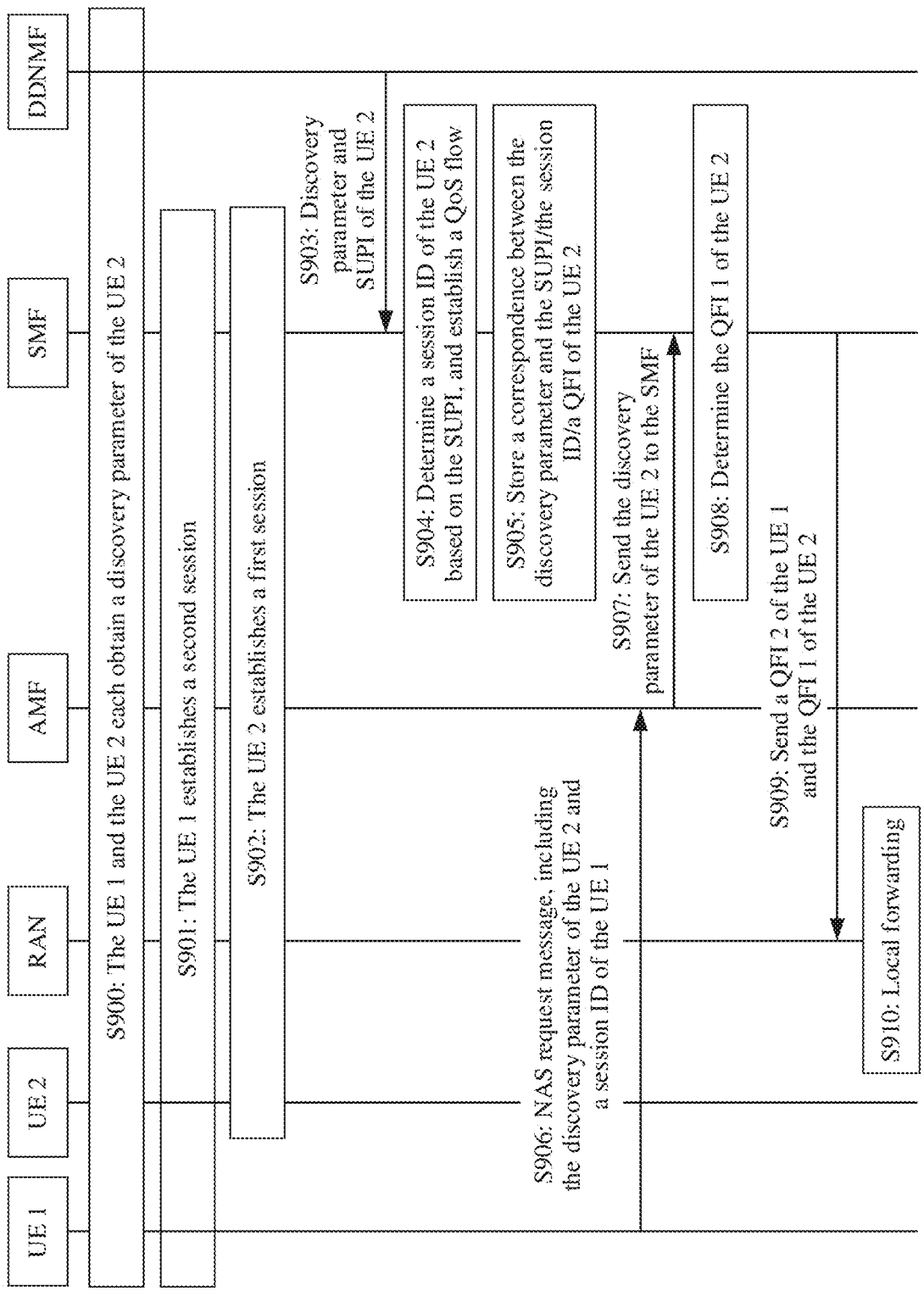

Refer to FIG. 12 and FIG. 13. An identifier of UE 2 may be a discovery parameter of the UE 2, for example, a ProSe restricted code. An SMF obtains the ProSe restricted code of the UE 2 from a DDNMF, so that the SMF establishes a correspondence between the ProSe restricted code of the UE 2 and an identifier of a second bearer. In the embodiment shown in FIG. 12, the second bearer is a first session. In the embodiment shown in FIG. 13, the second bearer is a first QoS flow. The following separately provides specific descriptions.

As shown in FIG. 12, this embodiment includes but is not limited to the following steps.

S800: UE 1 and UE 2 each obtain a ProSe restricted code of the UE 2.

S801: The UE 1 establishes a second session.

S802: The UE 2 establishes a first session.

For specific descriptions of step S800 to step S802, refer to descriptions of step S600 to step S602 in the embodiment in FIG. 10. Details are not described herein again.

S803: A DDNMF sends the ProSe restricted code and an SUPI of the UE 2 to an SMF.

Optionally, address information of the SMF is preconfigured in the DDNMF. The DDNMF may send the ProSe restricted code and the SUPI of the UE 2 to the SMF via an event notify message (Event Exposure Notify) or a newly defined message.

Optionally, the DDNMF may send the ProSe restricted code and the SUPI of the UE 2 to the SMF after allocating the ProSe restricted code to the UE 2.

Optionally, alternatively, the DDNMF may send the ProSe restricted code and the SUPI of the UE 2 to the SMF after receiving third indication information sent by the UE 2.

S804: After obtaining the SUPI of the UE 2, the SMF determines the first session that is established for the UE 2 and that is used for D2D communication, and obtains a session identifier (PDU session 1 ID) of the first session of the UE 2. The SMF stores a correspondence between the ProSe restricted code of the UE 2 and the session identifier (PDU session 1 ID) of the first session, for example, stores a correspondence between (ProSe Restricted Code) and (SUPI of the UE 2, PDU session 1 ID).

S805: The UE 1 requests to communicate with the UE 2 from a core network.

S806: An AMF sends a first message to the SMF, where the first message includes the ProSe restricted code of the UE 2.

For specific descriptions of steps S805 and S806, refer to steps S605 and S606 in the embodiment in FIG. 10. Details are not described herein again.

S807: The SMF determines the session identifier (PDU session 1 ID) of the first session of the UE 2 based on the ProSe restricted code of the UE 2 in the first message and the correspondence stored in step S804.

Optionally, the first message includes a session identifier (PDU session 2 ID) of the second session of the UE 1.

S808: The SMF sends configuration information to a RAN through the AMF.

The configuration information may include a correspondence between the second session of the UE 1 and the first session of the UE 2. In the correspondence, the second session may be identified by using the PDU session 2 ID, and the first session may be identified by using the PDU session 1 ID.

S809: The RAN performs local forwarding based on the correspondence between the second session of the UE 1 and the first session of the UE 2.

For specific descriptions of step S808 and step S809, refer to descriptions of step S208 and step S209 in the embodiment in FIG. 6. Details are not described herein again.

As shown in FIG. 13, this embodiment includes but is not limited to the following steps.

S900: UE 1 and UE 2 each obtain a ProSe restricted code of the UE 2.

S901: The UE 1 establishes a second session.

S902: The UE 2 establishes a first session.

S903: A DDNMF sends the ProSe restricted code and an SUPI of the UE 2 to an SMF.

For specific descriptions of step S900 to step S903, refer to descriptions of step S800 to step S803 in the embodiment in FIG. 12. Details are not described herein again.

S904: After obtaining the SUPI of the UE 2, the SMF determines the first session that is established for the UE 2 and that is used for D2D communication, and obtains a session identifier (PDU session 1 ID) of the first session of the UE 2.

The SMF establishes a first QoS flow of the first session based on the ProSe restricted code of the UE 2, where the first QoS flow of the first session may be identified by using the PDU session 1 ID and a QFI 1.

Optionally, when sending the ProSe restricted code of the UE 2 to the SMF, the DDNMF may request the SMF to establish the QoS flow. Alternatively, when obtaining the ProSe restricted code of the UE 2 from the DDNMF, the SMF actively triggers establishment of the QoS flow. This is not limited in this embodiment of this application.

S905: The SMF stores a correspondence between the ProSe restricted code of the UE 2 and the QFI of the first QoS flow of the first session, for example, stores a correspondence between (ProSe Restricted Code) and (SUPI of the UE 2, PDU session 1 ID, QFI 1).

S906: The UE 1 requests to communicate with the UE 2 from a core network.

S907: An AMF sends a first message to the SMF, where the first message may include the ProSe restricted code of the UE 2, and optionally, the first message may further include a session identifier (PDU session 2 ID) of the second session of the UE 1.

For specific descriptions of steps S906 and S907, refer to steps S605 and S606 in the embodiment in FIG. 10. Details are not described herein again.

S908: The SMF determines the QFI of the first QOS flow of the first session of the UE 2 based on the ProSe restricted code of the UE 2 in the first message and the correspondence stored in step S905.

In an example, the first message may further include a QFI of a second QOS flow of the second session of the UE 1, and the second QoS flow of the second session may be identified by using the PDU session 2 ID and a QFI 2.

In another example, the first message may further include the session identifier (PDU session 2 ID) of the second session of the UE 1 and seventh information. The seventh information is an identifier (APP ID) of a first application and/or an application layer identifier (APP User 1 ID) of the UE 1. The SMF may establish a second QoS flow of the second session based on the seventh information. The second QoS flow of the second session may be identified by using the PDU session 2 ID and a QFI 2.

S909: The SMF sends configuration information to a RAN through the AMF.

The configuration information may include a correspondence between the second QoS flow of the second session of the UE 1 and the first QOS flow of the first session of the UE 2.

S910: The RAN performs local forwarding based on the correspondence between the second QoS flow of the second session of the UE 1 and the first QoS flow of the first session of the UE 2.

For specific descriptions of step S909 and step S910, refer to descriptions of step S309 and step S310 in the embodiment in FIG. 7. Details are not described herein again.

Figure 14:
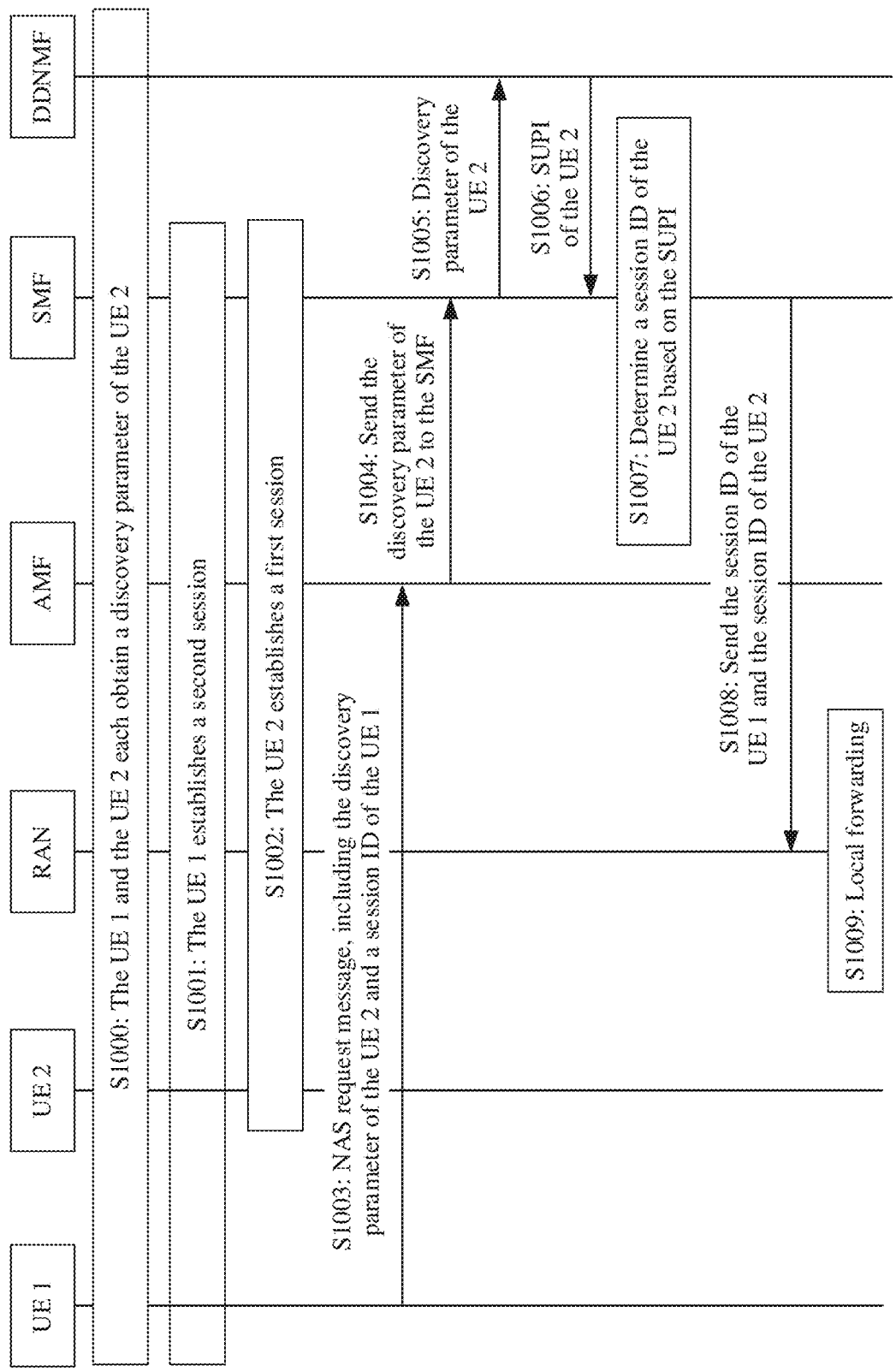
Figure 15:
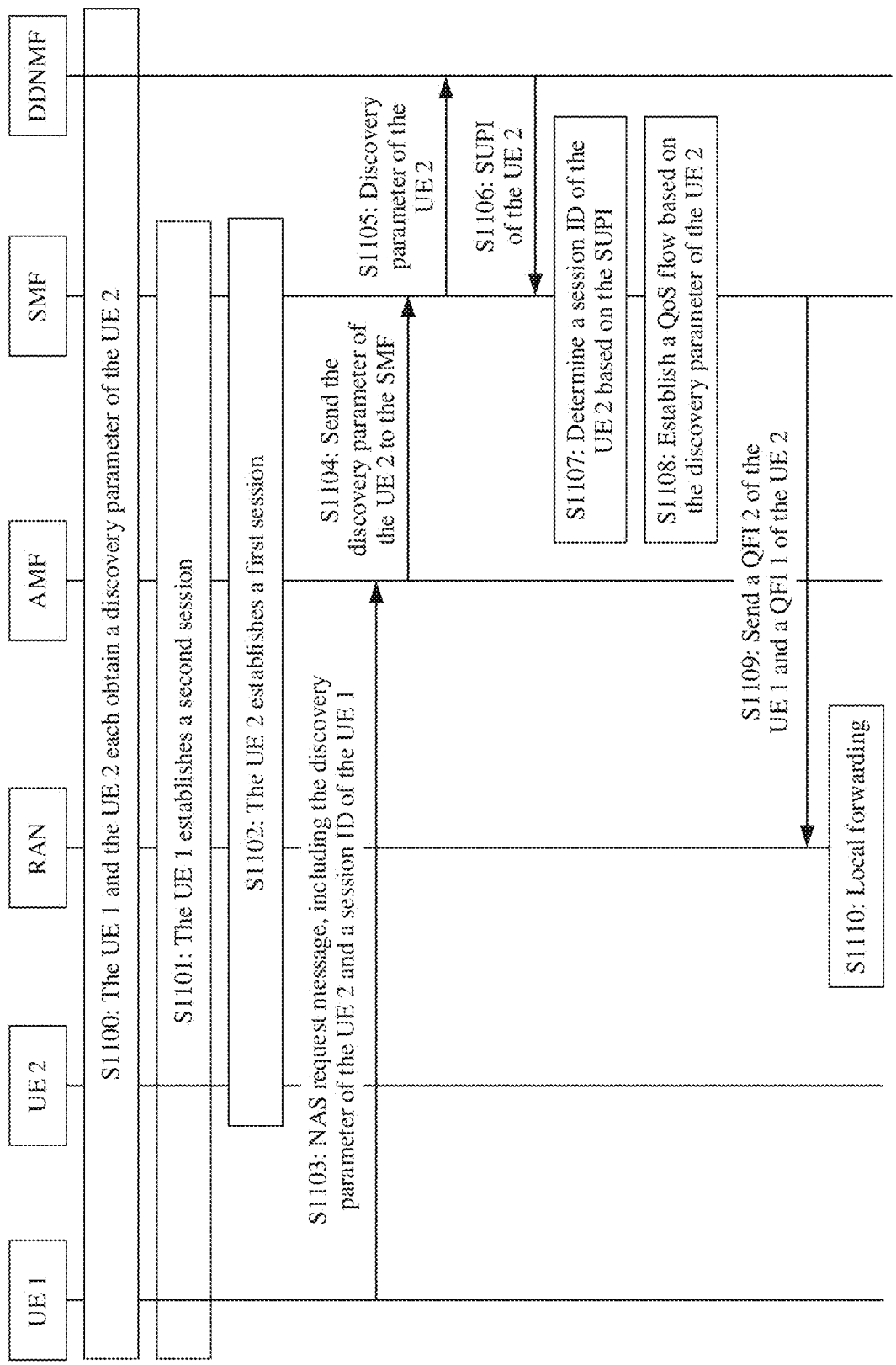

Refer to FIG. 14 and FIG. 15. An identifier of UE 2 may be a discovery parameter of the UE 2, for example, a ProSe restricted code. An SMF does not establish a correspondence between the ProSe restricted code of the UE 2 and an identifier of a second bearer. Instead, when a first message including the ProSe restricted code of the UE 2 is received, the identifier of the second bearer is determined based on an SUPI that is of the UE 2 and that is obtained from a DDNMF. In the embodiment shown in FIG. 14, the second bearer is a first session. In the embodiment shown in FIG. 15, the second bearer is a first QoS flow. The following separately provides specific descriptions.

As shown in FIG. 14, this embodiment includes but is not limited to the following steps.

S1000: UE 1 and UE 2 each obtain a ProSe restricted code of the UE 2.

S1001: The UE 1 establishes a second session.

S1002: The UE 2 establishes a first session.

For specific descriptions of step S900 to step S903, refer to descriptions of step S600 to step S602 in the embodiment in FIG. 10. Details are not described herein again.

S1003: The UE 1 requests to communicate with the UE 2 from a core network.

S1004: An AMF sends a first message to an SMF, where the first message includes the ProSe restricted code of the UE 2.

For specific descriptions of steps S1003 and S1004, refer to steps S605 and S606 in the embodiment in FIG. 10. Details are not described herein again.

S1005: After receiving the first message, the SMF requests, from a DDNMF, to obtain an SUPI that is of the UE 2 and that corresponds to the ProSe restricted code of the UE 2.

Optionally, address information of the DDNMF may be preconfigured in the SMF.

S1006: The DDNMF sends the SUPI of the UE 2 to the SMF.

Optionally, the DDNMF may send a correspondence between the ProSe restricted code and the SUPI of the UE 2 to the SMF.

Optionally, the DDNMF stores the correspondence between the ProSe restricted code and the SUPI of the UE 2.

S1007: After obtaining the SUPI of the UE 2, the SMF determines the first session that is established for the UE 2 and that is used for D2D communication, and obtains a session identifier (PDU session 1 ID) of the first session.

Optionally, the first message further includes a session identifier (PDU session 2 ID) of the second session of the UE 1.

S1008: The SMF sends configuration information to a RAN through the AMF.

The configuration information may include a correspondence between the second session of the UE 1 and the first session of the UE 2. In the correspondence, the second session may be identified by using the PDU session 2 ID, and the first session may be identified by using the PDU session 1 ID.

S1009: The RAN performs local forwarding based on the correspondence between the second session of the UE 1 and the first session of the UE 2.

For specific descriptions of step S1008 and step S1009, refer to descriptions of step S208 and step S209 in the embodiment in FIG. 6. Details are not described herein again.

As shown in FIG. 15, this embodiment includes but is not limited to the following steps.

S1100: UE 1 and UE 2 each obtain a ProSe restricted code of the UE 2.

S1101: The UE 1 establishes a second session.

S1102: The UE 2 establishes a first session.

For specific descriptions of step S900 to step S903, refer to descriptions of step S600 to step S602 in the embodiment in FIG. 10. Details are not described herein again.

S1103: The UE 1 requests to communicate with the UE 2 from a core network.

S1104: An AMF sends a first message to an SMF, where the first message includes the ProSe restricted code of the UE 2.

For specific descriptions of steps S1003 and S1004, refer to steps S605 and S606 in the embodiment in FIG. 10. Details are not described herein again.

S1105: After receiving the first message, the SMF requests, from a DDNMF, to obtain an SUPI that is of the UE 2 and that corresponds to the ProSe restricted code of the UE 2.

S1106: The DDNMF sends the SUPI of the UE 2 to the SMF.

Optionally, the DDNMF further sends a correspondence between the ProSe restricted code and the SUPI of the UE 2 to the SMF.

S1107: After obtaining the SUPI of the UE 2, the SMF determines the first session that is established for the UE 2 and that is used for D2D communication, and obtains a session identifier (PDU session 1 ID) of the first session of the UE 2.

Optionally, the first message further includes a session identifier (PDU session 2 ID) of the second session of the UE 1.

S1108: The SMF establishes a first QOS flow of the first session based on the ProSe restricted code of the UE 2. The first QoS flow of the first session may be identified by using the PDU session 1 ID and a QFI 1.

In an example, the first message further includes seventh information. The seventh information includes an identifier (APP ID) of a first application and/or an application layer identifier (APP User 1 ID) of the UE 1. The SMF may establish a second QoS flow of the second session based on the seventh information. The second QoS flow of the second session may be identified by using the PDU session 2 ID and a QFI 2.

S1109: The SMF sends configuration information to a RAN through the AMF.

The configuration information may include a correspondence between the second QoS flow of the second session of the UE 1 and the first QoS flow of the first session of the UE 2. In the correspondence, the second QoS flow of the second session may be identified by using the PDU session 2 ID and the QFI 2, and the first QoS flow of the first session may be identified by using the PDU session 1 ID and the QFI 1.

S1110: The RAN performs local forwarding based on the correspondence between the second QoS flow of the second session and the first QoS flow of the first session.

For specific descriptions of step S1109 and step S1110, refer to descriptions of step S309 and step S310 in the embodiment in FIG. 7. Details are not described herein again.

If a first bearer and a second bearer that are determined by an SMF correspond to a same RAN, the SMF sends an identifier of the first bearer and an identifier of the second bearer to the RAN through an AMF, and the RAN locally forwards data based on the identifier of the first bearer and the identifier of the second bearer. For details, refer to descriptions of the embodiments in FIG. 5 to FIG. 15. If a first bearer and a second bearer that are determined by an SMF correspond to different RANs, for example, the first bearer corresponds to a RAN 1, and the second bearer corresponds to a RAN 2, establishment of a forwarding tunnel between the RAN 1 and the RAN 2 may be triggered to transmit data of a first application. For details, refer to descriptions in FIG. 16.

Figure 16:
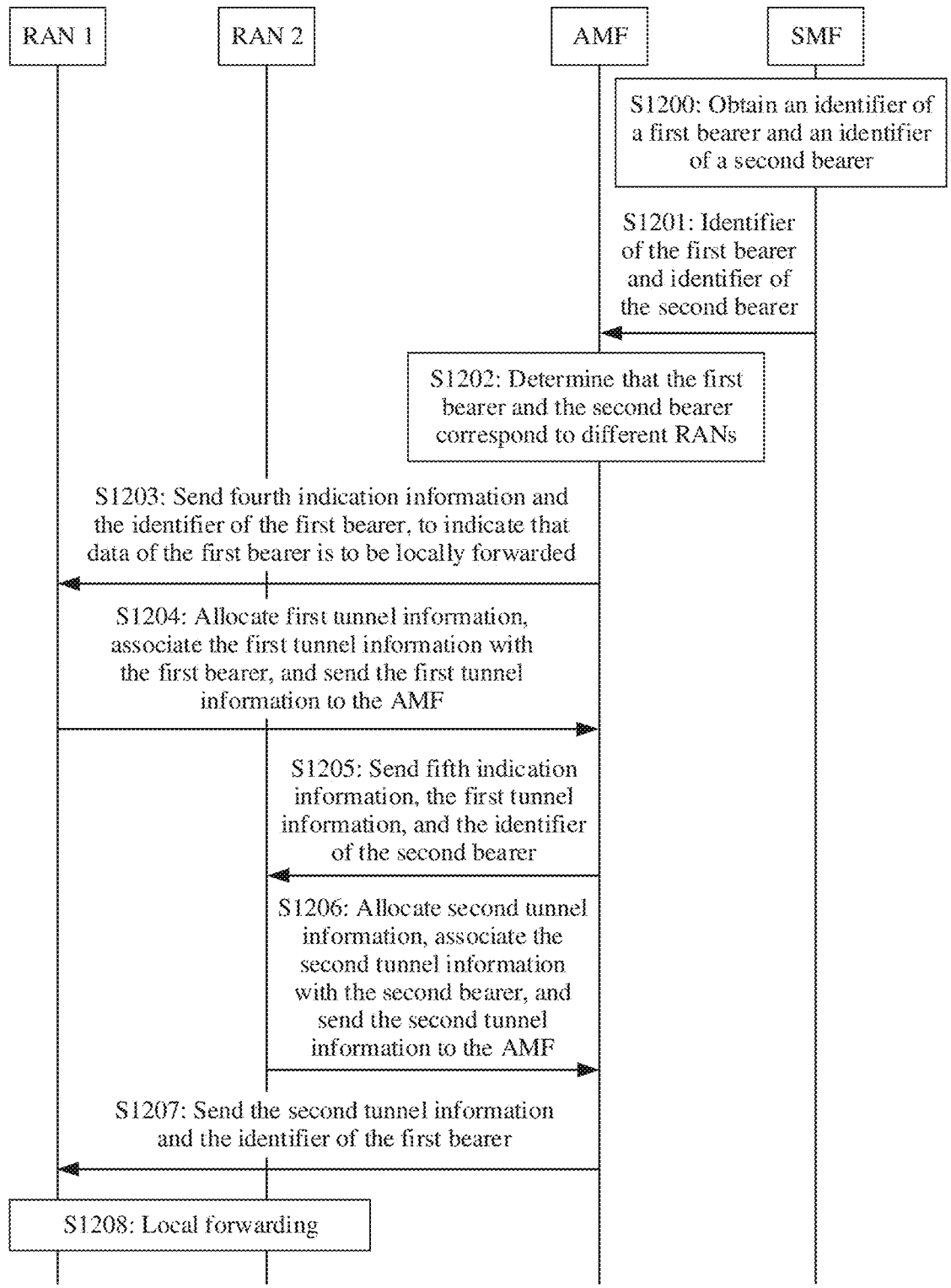

As shown in FIG. 16, this embodiment includes but is not limited to the following steps.

S1200: An SMF obtains an identifier of a first bearer and an identifier of a second bearer.

Both the first bearer and the second bearer may be sessions, or both the first bearer and the second bearer may be QoS flows.

For a process in which the SMF obtains the identifier of the first bearer and the identifier of the second bearer, refer to specific descriptions in FIG. 5 to FIG. 15 in the foregoing embodiments. Details are not described herein again.

S1201: The SMF sends the identifier of the first bearer and the identifier of the second bearer to an AMF.

For example, the SMF may send the identifier of the first bearer and the identifier of the second bearer to the AMF via an N1N2 transfer message.

S1202: The AMF determines whether the first bearer and the second bearer correspond to a same RAN. If the first bearer and the second bearer correspond to the same RAN, the AMF sends the identifier of the first bearer and the identifier of the second bearer to a RAN.

Correspondingly, the RAN may perform local forwarding based on the identifier of the first bearer and the identifier of the second bearer. For details, refer to descriptions in the embodiments in FIG. 5 to FIG. 15.

If the first bearer and the second bearer correspond to different RANs, the AMF triggers establishment of a forwarding tunnel between a RAN 1 and a RAN 2. For details, refer to descriptions of step S1203 to step S1208.

S1203: The AMF sends a request message to the RAN 1.

The request message may be an N2 PDU session request message (for example, an N2 PDU session request message). The request message may include fourth indication information (for example, a local switch indication) and the identifier of the first bearer. For example, the identifier of the first bearer may be a session identifier (PDU Session 2 ID) of a second session of UE 1, and the fourth indication information indicates that data corresponding to the first bearer is to be locally forwarded.

S1204: The RAN 1 allocates first tunnel information (for example, tunnel info of the RAN 1) for local forwarding, and associates the first tunnel information with the first bearer.

For example, the RAN 1 associates the session identifier (PDU session 2 ID) of the second session of the UE 1 with the first tunnel information of the RAN 1. Associating the first tunnel information with the first bearer refers to forwarding, on the first bearer, data received through a first tunnel corresponding to the first tunnel information. For example, the RAN 1 forwards, to the UE 1 through the second session of the UE 1, the data received through the first tunnel. Optionally, the RAN 1 may allocate the first tunnel information based on the received fourth indication information. The first tunnel information may be an IP address and a tunnel endpoint identifier (tunnel endpoint ID, TEID) of the RAN 1.

The RAN 1 sends the first tunnel information to the AMF.

S1205: The AMF sends a request message to the RAN 2.

The request message may include fifth indication information (for example, a local switch indication), the first tunnel information (for example, the tunnel info of the RAN 1), and the identifier of the second bearer. For example, the identifier of the second bearer may be a session identifier (PDU Session 1 ID) of a first session of UE 2.

The fifth indication information may indicate that data corresponding to the second bearer is to be locally forwarded. The fifth indication information may further indicate the RAN 2 to forward, to the RAN 1 through the first tunnel corresponding to the first tunnel information (for example, the tunnel info of the RAN 1), the data received on the second bearer.

S1206: The RAN 2 allocates second tunnel information (for example, tunnel info of the RAN 2) for local forwarding, and associates the second tunnel information with the second bearer.

For example, the RAN 2 associates the session identifier (PDU session 1 ID) of the first session of the UE 2 with the second tunnel information of the RAN 2. Associating the second tunnel information with the second bearer refers to forwarding, on the second bearer, data received through a second tunnel corresponding to the second tunnel information. For example, the data received through the second tunnel is forwarded to the UE 2 through the first session of the UE 2. Optionally, the RAN 2 may allocate the second tunnel information based on the received fifth indication information. The second tunnel information may be an IP address and a tunnel endpoint identifier (tunnel endpoint ID, TEID) of the RAN 2.

The RAN 2 sends the second tunnel information to the AMF.

S1207: The AMF sends the request message to the RAN 1, where the request message includes the second tunnel information (for example, the tunnel info of the RAN 2) and the identifier of the first bearer (for example, the session identifier of the second session of the UE 1), and the AMF indicates the RAN 1 to further forward, to the RAN 2 through the second tunnel corresponding to the second tunnel information, data received on the first bearer.

S1208: The RAN 1 and the RAN 2 perform local forwarding.

In some embodiments, for a case in which the UE 1 sends data to the UE 2, the RAN 1 receives, on the first bearer, the data sent by the UE 1, the RAN 1 forwards the data to the RAN 2 through the second tunnel corresponding to the second tunnel information, and the RAN 2 receives the data, and further forwards the data to the UE 2 on the second bearer. For a case in which the UE 2 sends data to the UE 1, the RAN 2 receives, on the second bearer, the data sent by the UE 2, the RAN 2 forwards the data to the RAN 1 through the first tunnel corresponding to the first tunnel information, and the RAN 1 receives the data, and further forwards the data to the UE 1 on the first bearer.

The methods provided in embodiments of this application are described above in detail with reference to FIG. 5 to FIG. 16. Apparatuses provided in embodiments of this application are described below in detail with reference to FIG. 17 to FIG. 19.

It may be understood that, to implement functions in the foregoing embodiments, a session management network element, an access network device, a first terminal, a second terminal, and a DDNMF network element include corresponding hardware structures and/or software modules for performing the functions. A person skilled in the art should easily be aware that, in combination with the units and the method steps in the examples described in embodiments disclosed in this application, this application can be implemented by using hardware, software, or a combination of hardware and software. Whether a function is performed by using hardware, software, or hardware driven by computer software depends on particular application scenarios and design constraints of the technical solutions.

Figure 17:
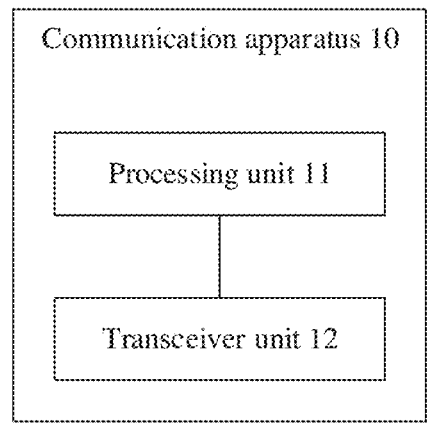
FIG. 17 is a schematic block diagram of a communication apparatus according to this application.

FIG. 17 is a schematic block diagram of a communication apparatus according to an embodiment of this application. As shown in FIG. 17, the communication apparatus 10 may include a processing unit 11 and a transceiver unit 12. The processing unit 11 and the transceiver unit 12 may be software, hardware, or a combination of software and hardware.

The transceiver unit 12 may include a sending unit and a receiving unit. The sending unit is configured to implement a sending function, the receiving unit is configured to implement a receiving function, and the transceiver unit 12 may implement the sending function and/or the receiving function. The transceiver unit may alternatively be described as a communication unit.

Optionally, the transceiver unit 12 may be configured to receive information sent by another apparatus, and may be further configured to send information to another apparatus. The processing unit 11 may be configured to perform internal processing of the apparatus.

In a possible design, the communication apparatus 10 may correspond to the session management network element in the foregoing method embodiments. For example, the communication apparatus 10 may be the session management network element, or may be a chip in the session management network element. The communication apparatus 10 may include units configured to perform the operations performed by the session management network element in the foregoing method embodiments. In addition, the units in the communication apparatus 10 are separately configured to perform the operations performed by the session management network element in the foregoing method embodiments.

For example, the processing unit 11 is configured to perform the following operations through the transceiver unit 12:
    receiving a first message, where the first message includes an identifier of a second terminal, and the first message requests to perform communication of a first application between a first terminal and the second terminal; and
    sending first information to an access network device based on the first message, where the first information includes an identifier of a first bearer and an identifier of a second bearer, the first bearer is for transmitting data of the first application for the first terminal, the second bearer is for transmitting the data of the first application for the second terminal, and the first information is used by the access network device to directly forward the data of the first application between the first terminal and the second terminal.

In a possible design, the communication apparatus 10 may correspond to an access network device or a chip in the access network device. The communication apparatus 10 may include units configured to perform the operations performed by the access network device in the foregoing method embodiments. In addition, the units in the communication apparatus 10 are separately configured to perform the operations performed by the access network device in the foregoing method embodiments.

For example, the processing unit 11 is configured to perform the following operations through the transceiver unit 12:
    receiving first information from a session management network element, where the first information includes an identifier of a first bearer and an identifier of a second bearer, the first bearer is for transmitting data of a first application for a first terminal, and the second bearer is for transmitting the data of the first application for a second terminal; and directly forwarding the data of the first application between the first terminal and the second terminal based on the identifier of the first bearer and the identifier of the second bearer.

In a possible design, the communication apparatus 10 may correspond to a first terminal or a chip in the first terminal. The communication apparatus 10 may include units configured to perform the operations performed by the first terminal in the foregoing method embodiments. In addition, the units in the communication apparatus 10 are separately configured to perform the operations performed by the first terminal in the foregoing method embodiments.

For example, the processing unit 11 is configured to perform the following operations through the transceiver unit 12: obtaining an identifier of a second terminal; and sending eighth information to an access and mobility management network element, where the eighth information includes the identifier of the second terminal, the eighth information is used by the access and mobility management network element to send a first message, the first message includes the identifier of the second terminal, and the first message requests to perform communication of a first application between the first terminal and the second terminal.

In a possible design, the communication apparatus 10 may correspond to a second terminal or a chip in the second terminal. The communication apparatus 10 may include units configured to perform the operations performed by the second terminal in the foregoing method embodiments. In addition, the units in the communication apparatus 10 are separately configured to perform the operations performed by the second terminal in the foregoing method embodiments.

For example, the processing unit 11 is configured to perform the following operations through the transceiver unit 12: obtaining an identifier of the second terminal; and sending the identifier of the second terminal to a session management network element, where the identifier of the second terminal is used by the session management network element to obtain a correspondence between the identifier of the second terminal and an identifier of a second bearer, and the second bearer is for transmitting data of a first application for the second terminal.

In a possible design, the communication apparatus 10 may be corresponding to a DDNMF network element or a chip in the DDNMF network element. The communication apparatus 10 may include units configured to perform the operations performed by the DDNMF network element in the foregoing method embodiments. In addition, the units in the communication apparatus 10 are separately configured to perform the operations performed by the DDNMF network element in the foregoing method embodiments.

For example, the processing unit 11 is configured to perform the following operations through the transceiver unit 12: receiving a third message, where the third message requests a discovery parameter of a second terminal; and sending the discovery parameter of the second terminal and third indication information to a first terminal, where the third indication information indicates to discover the second terminal through a core network by using the discovery parameter of the second terminal.

It should be understood that when the communication apparatus 10 is the chip configured in the session management network element, the access network device, the first terminal, the second terminal, and the DDNMF network element, the transceiver unit 12 in the communication apparatus 10 may be an input/output interface.

Figure 18:
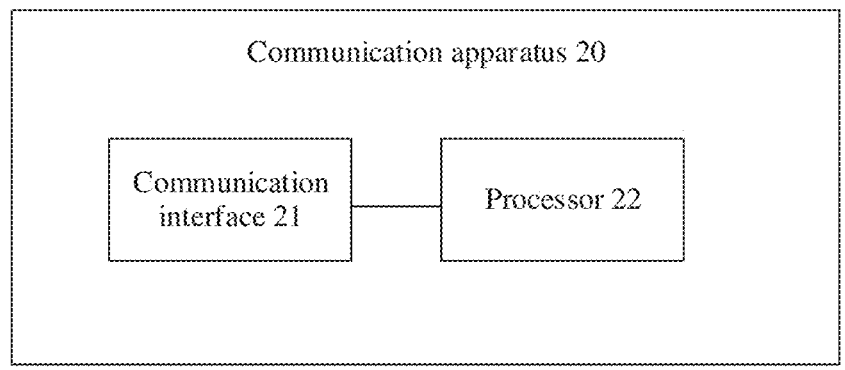
FIG. 18 is a schematic block diagram of another communication apparatus according to an embodiment of this application.

It should be understood that when the communication apparatus 10 is the session management network element, the access network device, the first terminal, the second terminal, and the DDNMF network element, the transceiver unit 12 in the communication apparatus 10 may correspond to a communication interface 21 shown in FIG. 18, and the processing unit 11 may correspond to a processor 22 shown in FIG. 18.

FIG. 18 is a schematic diagram of a structure of a communication apparatus according to an embodiment of this application. It should be understood that the communication apparatus 20 shown in FIG. 18 is merely an example. The communication apparatus in this embodiment of this application may further include another component, or a component with a function similar to that of each component in FIG. 18, or may not necessarily include all components in FIG. 18.

The communication apparatus 20 includes a communication interface 21 and at least one processor 22.

The communication apparatus 20 may correspond to any network element or device in a session management network element, an access network device, a first terminal, a second terminal, and a DDNMF network element. The communication interface 21 is configured to send and receive a signal, and the at least one processor 22 executes program instructions, so that the communication apparatus 20 implements a corresponding procedure of the method performed by a corresponding network element in the foregoing method embodiments. For details, refer to the descriptions in the foregoing method embodiments. Details are not described herein again.

Figure 19:
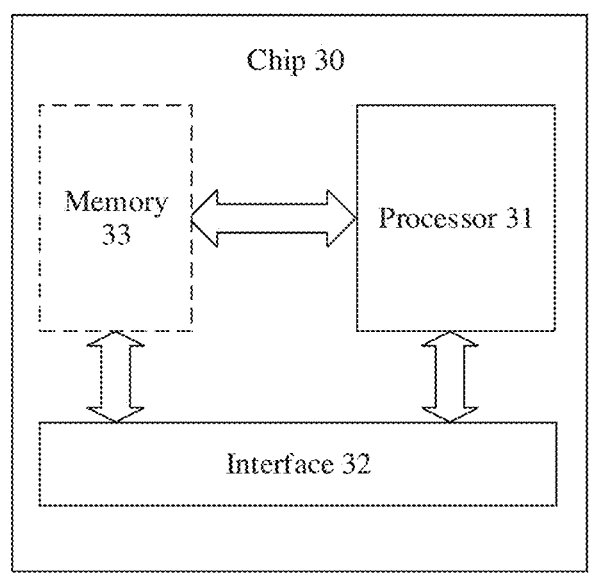
FIG. 19 is a schematic diagram of a structure of a chip according to an embodiment of this application.

When the communication apparatus may be a chip or a chip system, refer to a schematic diagram of a structure of a chip shown in FIG. 19. The chip 30 shown in FIG. 19 includes a processor 31 and an interface 32. There may be one or more processors 31, and there may be a plurality of interfaces 32. It should be noted that functions respectively corresponding to the processor 31 and the interface 32 may be implemented by using a hardware design, a software design, or a combination of software and hardware. This is not limited herein.

Optionally, the chip may further include a memory 33, and the memory 33 is configured to store program instructions and data.

In this application, the processor 31 may be configured to: invoke, from the memory, a program for implementing the data communication method according to one or more embodiments of this application on one or more devices or network elements of the session management network element, the access network device, the first terminal, the second terminal, and the DDNMF network element, and execute instructions included in the program. The interface 32 may be configured to output an execution result of the processor 31. In this application, the interface 32 may be configured to output each message or information of the processor 31. For the data communication method provided in one or more embodiments of this application, refer to the embodiments shown in FIG. 5 to FIG. 16. Details are not described herein again.

The processor in this embodiment of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

According to the methods provided in embodiments of this application, this application further provides a computer program product. The computer program product includes computer program code. When the computer program code is run on a computer, the computer is enabled to perform the method performed by the session management network element side, the access network device side, the first terminal side, the second terminal side, and the DDNMF network element side in any one of the foregoing method embodiments.

In another embodiment of this application, a communication system is further provided. The communication system includes a session management network element and an access network device. Optionally, the communication system may further include a first terminal. Optionally, the communication system may further include a second terminal. Optionally, the communication system may further include a DDNMF network element. For example, the session management network element and the access network device may be the session management network element and the access network device provided in any one of the embodiments in FIG. 5 to FIG. 16, and are configured to perform steps performed by the corresponding network elements in any one of the embodiments in FIG. 5 to FIG. 16; and/or the first terminal may be the first terminal provided in any one of the embodiments in FIG. 5 to FIG. 16, and is configured to perform steps performed by the first terminal in any one of the embodiments in FIG. 5 to FIG. 16; and/or the second terminal may be the second terminal provided in any one of the embodiments in FIG. 5 to FIG. 16, and is configured to perform steps performed by the second terminal in any one of the embodiments in FIG. 5 to FIG. 16; and/or the DDNMF network element may be the DDNMF network element provided in any one of the embodiments in FIG. 5 to FIG. 16, and is configured to perform steps performed by the DDNMF network element in any one of the embodiments in FIG. 5 to FIG. 16.

An embodiment of this application further provides a processing apparatus, including a processor and an interface. The processor is configured to perform the method in any one of the foregoing method embodiments.

It should be understood that the processing apparatus may be a chip. For example, the processing apparatus may be a field programmable gate array (FPGA), may be a general-purpose processor, a digital signal processor (DSP), an application-specific integrated circuit (ASIC), the field programmable gate array (FPGA) or another programmable logic device, a discrete gate, a transistor logic device, or a discrete hardware component, may be a system on chip (SoC), may be a central processing unit (CPU), may be a network processor (NP), may be a digital signal processing circuit (DSP), may be a microcontroller unit (MCU), or may be a programmable controller (programmable logic device, PLD) or another integrated chip. The processing apparatus may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware in a decoding processor and a software module. The software module may be located in a mature storage medium in the art, for example, a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

All or some of the foregoing embodiments may be implemented by using software, hardware, firmware, or any combination thereof. When the software is used to implement embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

The session management network element, the access network device, the first terminal, the second terminal, and the DDNMF network element in the foregoing apparatus embodiments completely correspond to the session management network element, the access network device, the first terminal, the second terminal, and the DDNMF network element in the method embodiments, and corresponding modules or units perform corresponding steps. For example, a communication unit (transceiver) performs a receiving step or a sending step in the method embodiments, and a processing unit (processor) may perform a step other than the sending step and the receiving step. For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be but is not limited to a process that runs on a processor, a processor, an object, an executable file, an execution thread, a program, or a computer. As illustrated by using figures, both a computing device and an application that runs on the computing device may be components. One or more components may reside within a process or an execution thread, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, both "when" and "if" mean that a network element performs corresponding processing in an objective situation, but do not constitute a limitation on time, do not require that the network element has a determining action during implementation, and do not mean other limitations either.

It should be further understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

It should also be understood that the term "and/or" in this specification describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the session management network element, the access network device, the first terminal, the second terminal, and the DDNMF network element may perform some or all of the steps in embodiments of this application. These steps or operations are merely examples. In embodiments of this application, other operations or variations of various operations may be alternatively performed. In addition, the steps may be performed in a sequence different from a sequence presented in embodiments of this application, and not all the operations in embodiments of this application may be necessarily performed.

A person of ordinary skill in the art may be aware that, in combination with the examples described in embodiments disclosed in this specification, units and algorithm steps may be implemented by using electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, the apparatus, and the method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data communication method, comprising:
   receiving a first message, wherein the first message comprises an identifier of a second terminal, and the first message requests to perform communication of a first application between a first terminal and the second terminal; and
   sending first information to an access network device based on the first message,
   wherein the first information comprises an identifier of a first bearer and an identifier of a second bearer, the first bearer is for transmitting data of the first application for the first terminal, the second bearer is for transmitting the data of the first application for the second terminal, and the first information is used by the access network device to directly forward the data of the first application between the first terminal and the second terminal.

2. The data communication method according to claim 1, wherein the identifier of the second terminal is an application layer identifier of the second terminal or a discovery parameter of the second terminal, the application layer identifier of the second terminal is an identifier of the second terminal in the first application, and the discovery parameter of the second terminal corresponds to the application layer identifier of the second terminal in the first application.

3. The data communication method according to claim 1, wherein
the first bearer and the second bearer are sessions; or
the first bearer and the second bearer are quality of service (QOS) flows.

4. The data communication method according to claim 1, wherein sending the first information to the access network device based on the first message comprises:
obtaining the identifier of the second bearer based on the identifier of the second terminal; and
sending the first information to the access network device based on the identifier of the second bearer.

5. The data communication method according to claim 4, wherein
the first message further comprises an identifier of the first application, and
obtaining the identifier of the second bearer based on the identifier of the second terminal comprises:
obtaining the identifier of the second bearer based on the identifier of the second terminal and the identifier of the first application.

6. The data communication method according to claim 1, further comprising:
before receiving the first message, obtaining a correspondence between the identifier of the second terminal and the identifier of the second bearer.

7. The data communication method according to claim 6, wherein obtaining the correspondence between the identifier of the second terminal and the identifier of the second bearer comprises:
receiving second information from the second terminal, wherein the second information comprises the identifier of the second terminal and the identifier of the second bearer; and
establishing the correspondence between the identifier of the second terminal and the identifier of the second bearer.

8. The data communication method according to claim 1, wherein the first message further comprises the identifier of the first bearer.

9. The data communication method according to claim 1, further comprising:
receiving, by the access network device, the first information; and
directly forwarding, by the access network device, the data of the first application between the first terminal and the second terminal based on the identifier of the first bearer and the identifier of the second bearer.

10. A data communication method, comprising:
receiving first information from a session management network element, wherein the first information comprises an identifier of a first bearer and an identifier of a second bearer, the first bearer is for transmitting data of a first application for a first terminal, and the second bearer is for transmitting the data of the first application for a second terminal; and
directly forwarding the data of the first application between the first terminal and the second terminal based on the identifier of the first bearer and the identifier of the second bearer.

11. The data communication method according to claim 10, wherein
the first bearer and the second bearer are sessions; or
the first bearer and the second bearer are quality of service (QOS) flows.

12. The data communication method according to claim 10, wherein directly forwarding the data of the first application between the first terminal and the second terminal based on the identifier of the first bearer and the identifier of the second bearer comprises:
receiving the data of the first application on the first bearer, determining the identifier of the second bearer based on the identifier of the first bearer, and sending the data of the first application on the second bearer; or
receiving the data of the first application on the second bearer, determining the identifier of the first bearer based on the identifier of the second bearer, and sending the data of the first application on the first bearer.

13. A communication apparatus, comprising:
at least one processor; and
a memory having instructions stored thereon that, when executed by the at least one processor, causes the communication apparatus to:
receive first information from a session management network element, wherein the first information comprises an identifier of a first bearer and an identifier of a second bearer, the first bearer is for transmitting data of a first application for a first terminal, and the second bearer is for transmitting the data of the first application for a second terminal; and
directly forward the data of the first application between the first terminal and the second terminal based on the identifier of the first bearer and the identifier of the second bearer.

14. The communication apparatus according to claim 13, wherein
the first bearer and the second bearer are sessions; or
the first bearer and the second bearer are quality of service (QOS) flows.

15. The communication apparatus according to claim 13, wherein the communication apparatus is further caused to:
receive the data of the first application on the first bearer, determine the identifier of the second bearer based on the identifier of the first bearer, and send the data of the first application on the second bearer; or
receive the data of the first application on the second bearer, determine the identifier of the first bearer based on the identifier of the second bearer, and send the data of the first application on the first bearer.

16. A communication system, comprising:
an access network device; and
a session management network element, comprising:
a processor; and
a memory having instructions stored thereon that, when executed by the processor, cause the session management network element to:
receive a first message, wherein the first message comprises an identifier of a second terminal, and the first message requests to perform communication of a first application between a first terminal and the second terminal; and
send first information to the access network device based on the first message, wherein the first information comprises an identifier of a first bearer and an identifier of a second bearer, the first bearer is for transmitting data of the first application for the first terminal, the second bearer is for transmitting the data of the first application for the second terminal, and the first information is used by the access network device to directly forward the data of the first application between the first terminal and the second terminal, wherein the access network device is configured to:
receive the first information; and
directly forward the data of the first application between the first terminal and the second terminal based on the identifier of the first bearer and the identifier of the second bearer.

17. The communication system according to claim 16, wherein the identifier of the second terminal is an application layer identifier of the second terminal or a discovery parameter of the second terminal, the application layer identifier of the second terminal is an identifier of the second terminal in the first application, and the discovery parameter of the second terminal corresponds to the application layer identifier of the second terminal in the first application.

18. The communication system according to claim 16, wherein
the first bearer and the second bearer are sessions; or
the first bearer and the second bearer are quality of service (QOS) flows.

19. The communication system according to claim 16, wherein the session management network element is further caused to:
obtain the identifier of the second bearer based on the identifier of the second terminal; and
send the first information to the access network device based on the identifier of the second bearer.

20. The communication system according to claim 19, wherein
the first message further comprises an identifier of the first application, and
the session management network element is further caused to:
obtain the identifier of the second bearer based on the identifier of the second terminal and the identifier of the first application.

* * * * *